US012420553B2

(12) United States Patent
Shimazaki et al.

(10) Patent No.: US 12,420,553 B2
(45) Date of Patent: Sep. 23, 2025

(54) LIQUID CONTAINER, PRINTING DEVICE

(71) Applicant: SEIKO EPSON CORPORATION, Tokyo (JP)

(72) Inventors: Jun Shimazaki, Shiojiri (JP); Azusa Takagi, Shiojiri (JP); Kazuyoshi Mizuno, Chino (JP); Shigenori Nakagawa, Tatsuno-Machi (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 17/936,497

(22) Filed: Sep. 29, 2022

(65) Prior Publication Data

US 2023/0106773 A1 Apr. 6, 2023

(30) Foreign Application Priority Data

Sep. 30, 2021 (JP) ................................ 2021-161388

(51) Int. Cl.
*B41J 2/175* (2006.01)

(52) U.S. Cl.
CPC ....... *B41J 2/17513* (2013.01); *B41J 2/17526* (2013.01); *B41J 2/17566* (2013.01); *B41J 2002/17573* (2013.01)

(58) Field of Classification Search
CPC .... B41J 2/175; B41J 2/17503; B41J 2/17506; B41J 2/17509; B41J 2/17513; B41J 2/17523; B41J 2/17526; B41J 2/1755; B41J 2/17553; B41J 2/17566; B41J 2002/17573
See application file for complete search history.

(56) References Cited

U.S. PATENT DOCUMENTS 6,619,776 B2 * 9/2003 Yoshiyama .......... B41J 2/17566 347/7
10,434,784 B2 10/2019 Hirata et al.
2011/0205267 A1 * 8/2011 Wang .................. B41J 2/17513 347/85
2014/0063140 A1 3/2014 Shimizu et al.
2014/0063147 A1 3/2014 Wamuro et al.
2017/0355191 A1 * 12/2017 Mizutani .............. B41J 2/17503
2018/0009231 A1 1/2018 Yokozawa et al.
2018/0093481 A1 4/2018 Hirata et al.

FOREIGN PATENT DOCUMENTS

JP 2014-061691 A 4/2014
JP 2014-061692 A 4/2014
JP 2016-168728 9/2016
JP 2018-008435 A 1/2018
JP 2018-052038 4/2018
JP 2019-034418 3/2019
JP 2020-163643 10/2020

* cited by examiner

*Primary Examiner* — Anh T Vo
(74) *Attorney, Agent, or Firm* — WORKMAN NYDEGGER

(57) ABSTRACT

The liquid container which can be attached to or detached from a coupler coupled to a liquid ejector for ejecting a liquid and can be installed at a position separated from the liquid ejector, the liquid container includes a liquid accommodation vessel having an accommodation chamber for accommodating the liquid and an injection port for injecting the liquid into the accommodation chamber, and a coupling section having a lead-out section capable of leading out the liquid in the accommodation chamber and couplable to the coupler.

21 Claims, 36 Drawing Sheets

LIQUID CONTAINER, PRINTING DEVICE

The present application is based on, and claims priority from JP Application Serial Number 2021-161388, filed Sep. 30, 2021, the disclosure of which is hereby incorporated by reference herein in its entirety.

BACKGROUND

1. Technical Field

The present disclosure relates to a liquid container capable of storing liquid and a printing device including the liquid container.

2. Related Art

For example, as in JP-A 2014-061692, there is a printer, which is an example of a printing device including a liquid container and a device main body, which is an example of a liquid ejector. The printer performs printing by ejecting ink, supplied from the liquid container, from a liquid ejecting head. The liquid container includes an injection port through which ink, which is an example of a liquid, is injected into the liquid container.

The liquid container of JP-A 2014-061692 is fixed in the device main body. Therefore, the volume of the liquid container cannot be increased, and the liquid must be frequently poured into the liquid container.

SUMMARY

A liquid container that solves the above problem is configured to attach to and detach from a coupler coupled to a liquid ejector for ejecting liquid, and can be installed at a position separated from the liquid ejector, the liquid container includes a liquid accommodation vessel having an accommodation chamber for accommodating the liquid and an injection port for injecting the liquid into the accommodation chamber, and a coupling section that includes a lead-out section configured to lead out the liquid in the accommodation chamber, and that couples to the coupler.

A printing device, according to an aspect of the present disclosure, includes a liquid ejector for ejecting liquid, a coupler coupled to the liquid ejector, and the liquid container configured as described above that is coupled, and configured to attach to and detach from the coupler.

DESCRIPTION OF EXEMPLARY EMBODIMENTS

Figure 1:
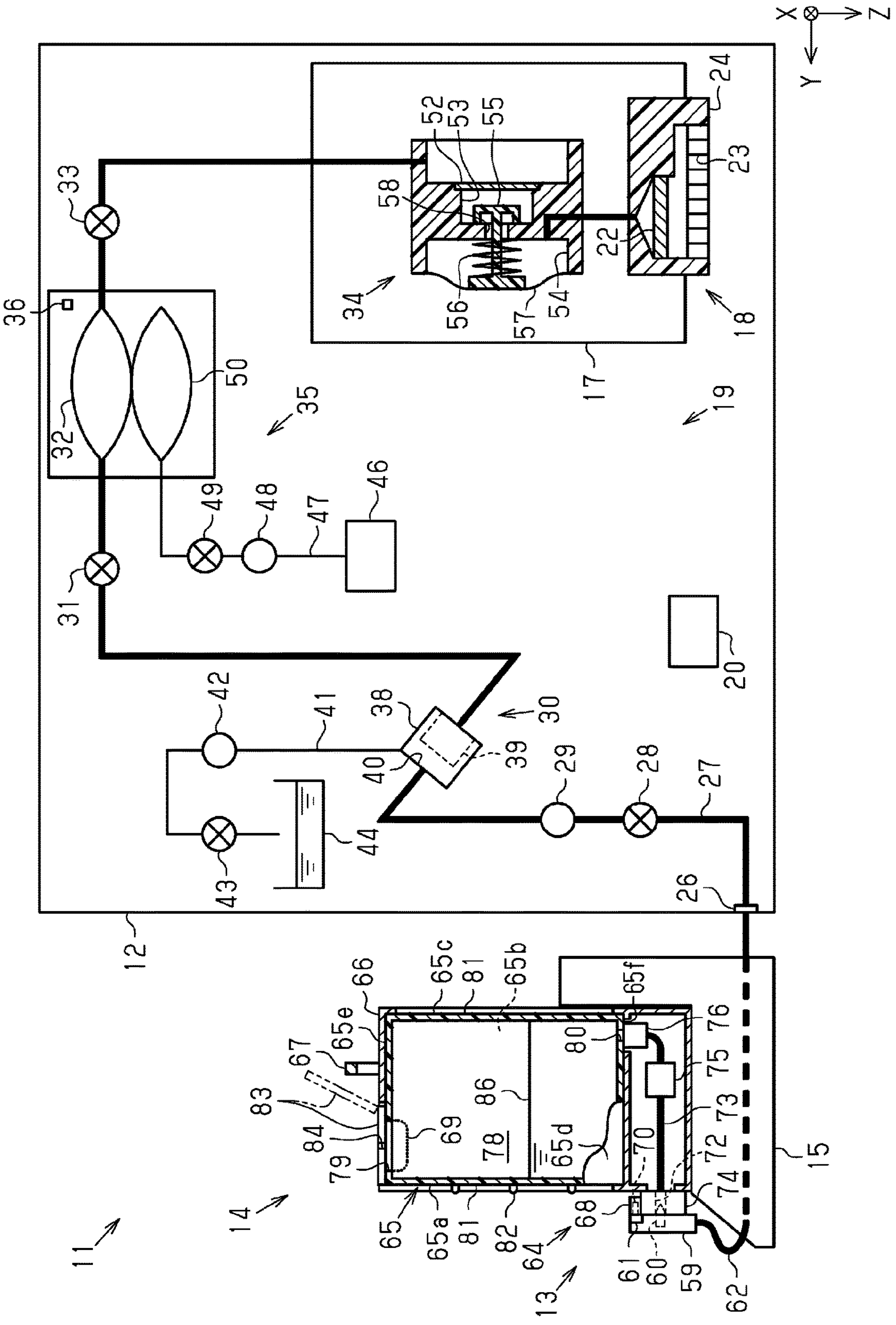
FIG. 1 is a schematic diagram of an embodiment of a printing device.

Hereinafter, an embodiment of a liquid container and a printing device will be described with reference to the drawings. The printing device is, for example, an inkjet type printer that performs printing by ejecting ink, which is an example of a liquid, onto a medium such as paper, fabric, vinyl, plastic parts, or metal parts.

In the drawings, assuming that a printing device 11 is placed on a horizontal plane, a direction of gravity is indicated by a Z-axis, and directions along the horizontal plane are indicated by an X-axis and a Y-axis. The X-axis, the Y-axis, and the Z-axis are orthogonal to each other. In the following description, a direction parallel to the X-axis is also referred to as a width direction X, a direction parallel to the Y-axis is also referred to as a depth direction Y, and a direction parallel to the Z-axis is also referred to as a vertical direction Z. One side in the depth direction Y is also referred to as a near side, and the other side is also referred to as a far side.

Printing Device

As shown in FIG. 1, the printing device 11 includes a liquid ejector 12, a coupler 13, and a liquid container 14. The printing device 11 may include a base 15 capable of supporting the liquid container 14. The base 15 may support a part of the coupler 13.

Liquid Ejector

The liquid ejector 12 ejects liquid. The liquid ejector 12 may include a carriage 17, a liquid ejection section 18, a liquid supply section 19, and a controller 20. The carriage 17 movably supports the liquid ejection section 18 and a part of the liquid supply section 19.

The printing device 11 of the present embodiment performs single-color printing by the liquid ejection section 18 ejecting one type of liquid supplied from one liquid container 14. In a case where the liquid ejection section 18 ejects a plurality of types of liquids to perform color printing, the printing device 11 may include a plurality of liquid containers 14, a plurality of couplers 13, and a plurality of liquid supply sections 19.

Liquid Ejection Section

The liquid ejection section 18 may include an ejection section internal filter 22. The ejection section internal filter 22 is provided in the liquid ejection section 18. The ejection section internal filter 22 can capture foreign substances such as air bubbles in the liquid supplied by the liquid supply section 19.

The liquid ejection section 18 includes a nozzle forming surface 24 in which a plurality of nozzles 23 is formed. The liquid ejection section 18 ejects liquid from the nozzles 23 while moving together with the carriage 17, thereby printing on a medium (not shown).

Liquid Supply Section

The liquid supply section 19 supplies liquid to the liquid ejection section 18. The liquid supply section 19 may include a joint 26, a liquid supply path 27, a feed valve 28, a feed pump 29, a collector 30, an upstream valve 31, an intermediate storage 32, a downstream valve 33, and a pressure adjustment mechanism 34. The feed valve 28, the feed pump 29, the collector 30, the upstream valve 31, the intermediate storage 32, the downstream valve 33, and the pressure adjustment mechanism 34 are provided in the liquid supply path 27 in this order from the upstream side. The liquid supply section 19 may include a pressurizing mechanism 35 and a liquid amount sensor 36.

The joint 26 is provided at the upstream end of the liquid supply path 27. The joint 26 couples the coupler 13 to the liquid supply path 27. The joint 26 allows liquid to flow between the coupler 13 and the liquid supply path 27.

The liquid supply path 27 may be formed of, for example, a flexible tube. A downstream end of the liquid supply path 27 is coupled to the liquid ejection section 18. The liquid supply path 27 supplies, to the liquid ejection section 18, liquid that was supplied from the liquid container 14 through the coupler 13.

The feed valve 28, the upstream valve 31, and the downstream valve 33 open and close the liquid supply path 27. The feed valve 28, the upstream valve 31, and the downstream valve 33 may be constituted by, for example, electromagnetic valves. The feed valve 28, the upstream valve 31, and the downstream valve 33 may be closed when the power of the printing device 11 is off.

The feed pump 29 causes the liquid in the liquid supply path 27 to flow from upstream to downstream. The feed pump 29 may be constituted by, for example, a diaphragm pump.

The intermediate storage 32 may be formed of a flexible member into a bag shape. The intermediate storage 32 expands and contracts according to the amount of liquid stored inside. The liquid amount sensor 36 may detect the amount of liquid in the intermediate storage 32 from the degree of expansion of the intermediate storage 32.

Collector

The collector 30 may include a case 38, a feed filter 39, a filter chamber 40, a discharge path 41, a pressure sensor 42, a discharge valve 43, and a waste tank 44.

The filter chamber 40 is formed by the case 38. The filter chamber 40 accommodates the feed filter 39. The feed filter 39 collects foreign substances such as air bubbles in the liquid flowing through the liquid supply path 27.

The upstream end of the discharge path 41 is coupled to the filter chamber 40. The discharge path 41 is coupled upstream of the feed filter 39. When the discharge path 41 is coupled to a corner at the highest position in the filter chamber 40, bubbles can be efficiently discharged. The downstream end of the discharge path 41 is inserted into the waste tank 44. The discharge path 41 is capable of discharging fluid such as liquid or air bubbles in the liquid supply path 27 to the waste tank 44.

The pressure sensor 42 and the discharge valve 43 are provided in the discharge path 41. The pressure sensor 42 detects the pressure in the liquid supply path 27. The discharge valve 43 opens and closes the discharge path 41. The discharge valve 43 discharges the fluid from the discharge path 41 to the waste tank 44 by opening the discharge path 41.

Pressurizing Mechanism

The pressurizing mechanism 35 may include an air feed section 46, an air feed path 47, an air pressure sensor 48, an air valve 49, and a presser 50.

The air feed section 46 may be a receiving unit that receives pressurized air supplied from a facility such as a factory, or it may be configured by an air pump or the like.

The upstream end of the air feed path 47 is coupled to the air feed section 46. The downstream end of the air feed path 47 is coupled to the presser 50. The air feed path 47 couples the air feed section 46 and the presser 50 to each other.

The air feed section 46 enables flow of air between the air feed section 46 and the presser 50.

The air pressure sensor 48 and the air valve 49 are provided in the air feed path 47. The air pressure sensor 48 detects air pressure in the air feed path 47. The air valve 49 opens and closes the air feed path 47.

The presser 50 may be formed in a bag shape by a flexible member in the same way as the intermediate storage 32. The presser 50 is arranged adjacent to the intermediate storage 32. The presser 50 expands by being supplied with air from the air feed section 46. The expanded presser 50 presses the intermediate storage 32. The presser 50 supplies the liquid stored in the intermediate storage 32 to the liquid ejection section 18 by pressing the intermediate storage 32 in a state where the upstream valve 31 is closed and the downstream valve 33 is opened.

Pressure Adjustment Mechanism

The pressure adjustment mechanism 34 may be movably supported by the carriage 17. The pressure adjustment mechanism 34 may include an in-valve filter 52, a feed chamber 53, a pressure chamber 54, a valve body 55, a spring 56, and a diaphragm 57.

The in-valve filter 52 captures foreign matter such as air bubbles in the liquid.

A part of a wall surface of the feed chamber 53 is constituted by the in-valve filter 52. The liquid that has passed through the in-valve filter 52 flows into the feed chamber 53. The feed chamber 53 is held in a pressurized state by the liquid supplied from the intermediate storage 32. The feed chamber 53 is coupled to the pressure chamber 54 via a communication hole 58.

The valve body 55 is inserted into the communication hole 58. The valve body 55 is pressed by the spring 56 to close the communication hole 58.

A part of a wall surface of the pressure chamber 54 is formed by the diaphragm 57. The diaphragm 57 is flexibly deformable in a direction in which the spring 56 pushes the valve body 55. The outer surface of the diaphragm 57 is subjected to atmospheric pressure. The inner surface of the diaphragm 57 is subjected to the pressure of the liquid in the pressure chamber 54. Therefore, the diaphragm 57 is bent and displaced according to change in the differential pressure between the pressure of the liquid in the pressure chamber 54 and atmospheric pressure.

When the pressure in the pressure chamber 54 is lower than atmospheric pressure and also the differential pressure between the pressure in the pressure chamber 54 and atmospheric pressure is larger than a predetermined pressure difference, the diaphragm 57 moves the valve body 55 by pushing the valve body 55 against the spring 56. As a result, the communication hole 58 is opened, and the liquid can flow between the feed chamber 53 and the pressure chamber 54.

The pressure in the pressure chamber 54 increases as the liquid flows from the feed chamber 53 into the pressure chamber 54.

When the differential pressure between the pressure in the pressure chamber 54 and atmospheric pressure returns to the predetermined pressure difference, the valve body 55 closes the communication hole 58. In this manner, the pressure adjustment mechanism 34 adjusts the pressure of the liquid supplied to the liquid ejection section 18, and thereby adjusts the pressure in the liquid ejection section 18, which becomes the backpressure of the nozzles 23.

Controller

The controller 20 integrally controls drive of each mechanism in the printing device 11 and controls various operations executed in the printing device 11.

The controller 20 can be configured as a circuit including the following, a: one or more processors that execute various processes in accordance with a computer program, β: one or more dedicated hardware circuits that execute at least a part of various processes, or y: a combination thereof. The hardware circuit is, for example, an application specific integrated circuit. The processor includes a CPU and a memory such as a RAM and a ROM, wherein the memory stores program code or instructions configured to cause the CPU to perform processing. The memory, that is, the computer-readable medium, includes any readable medium that can be accessed by a general purpose or special purpose computer.

Coupler

The coupler 13 is coupled to the liquid ejector 12. The coupler 13 may include a linkage 59, an introduction section 60, a circuit board coupler 61, and a coupling path 62. The coupler 13 may include a communication unit (not shown). The communication unit electrically couples the circuit board coupler 61 to the controller 20 by wire or wireless communication. The linkage 59 holds the introduction section 60 and the circuit board coupler 61. The linkage 59 may be provided so as to be attachable to and detachable from the liquid container 14.

The introduction section 60 is capable of introducing a liquid from the liquid container 14. The coupling path 62 couples the introduction section 60 and the joint 26 to each other. The coupling path 62 sends the liquid introduced from the introduction section 60 to the liquid ejector 12.

Liquid Container

The liquid container 14 can contain liquid to be supplied to the liquid ejector 12. The liquid container 14 is detachably coupled to the coupler 13. The liquid container 14 can be placed at a position away from the liquid ejector 12.

The liquid container 14 includes a coupling section 64 and a liquid accommodation vessel 65. The liquid container 14 may include a holder 66, a gripping section 67, a circuit board 68, and a first filter 69 which is an example of a filter. The circuit board 68 includes a coupling terminal 70. The coupling terminal 70 is couplable to the circuit board coupler 61 provided in the coupler 13.

The holder 66 may hold the liquid accommodation vessel 65 and the coupling section 64.

The gripping section 67 may be provided at the holder 66. The gripping section 67 may be a handle or a recess as long as the user can grip the gripping section 67. The gripping section 67 may be provided behind an injection port 79 in the depth direction Y.

The coupling section 64 includes a lead-out section 72. The coupling section 64 may include a flow path 73, an adapter 74, a second filter 75, and an inlet 76.

The liquid accommodation vessel 65 includes an accommodation chamber 78 and the injection port 79. The liquid accommodation vessel 65 may include an outlet 80, a visual check section 81, a gauge 82, a lid 83, and an air open hole 84. The liquid accommodation vessel 65 may include a first side surface 65*a*, a second side surface 65*b*, a third side surface 65*c*, a fourth side surface 65*d*, a top surface 65*e*, and a lower surface 65*f*. That is, the liquid accommodation vessel 65 includes a plurality of side surfaces.

Coupling Section

The coupling section 64 is capable of coupling to the coupler 13. In the present embodiment, the adapter 74 is provided so as to be attachable to and detachable from the coupler 13. That is, the adapter 74 is couplable to the coupler 13. The linkage 59 is capable of attaching to the adapter 74. The adapter 74 may be located at a front position in the depth direction Y from the outlet 80.

The coupling section 64 may be coupled to a lower portion of the liquid accommodation vessel 65. Specifically, the coupling section 64 may be coupled to a portion lower in the vertical direction Z than the center of the liquid accommodation vessel 65. The coupling section 64 of the present embodiment is coupled to the lower surface 65*f* of the liquid accommodation vessel 65.

The flow path 73 couples the liquid accommodation vessel 65 and the lead-out section 72 to each other. In this embodiment, the inlet 76 couples the upstream end of the flow path 73 and the outlet 80 of the liquid accommodation vessel 65 to each other. The inlet 76 is connectable to the liquid accommodation vessel 65. The downstream end of the flow path 73 is coupled to the lead-out section 72. The lead-out section 72 of the present embodiment is provided in the adapter 74. The flow path 73 may couple the inlet 76 and the adapter 74 to each other.

The second filter 75 may be provided in the flow path 73. The second filter 75 may be detachably and attachably provided with respect to the flow path 73.

The lead-out section 72 can lead out the liquid in the accommodation chamber 78. When the linkage 59 is attached to the adapter 74, the introduction section 60 is coupled to the lead-out section 72. As a result, the liquid led out from the lead-out section 72 is introduced into the introduction section 60.

The circuit board 68 may be provided on the adapter 74. In a state in which the liquid container 14 is coupled to the coupler 13, the circuit board 68 may be arranged at a position higher than the lead-out section 72. When the linkage 59 is attached to the adapter 74, the coupling terminal 70 is coupled to the circuit board coupler 61. The circuit board 68 may store information indicating the liquid container 14.

Liquid Accommodation Vessel

The top surface 65*e* is located above the first side surface 65*a*, the second side surface 65*b*, the third side surface 65*c*, the fourth side surface 65*d* in the vertical direction Z. The lower surface 65*f* is located below the first side surface 65*a*, the second side surface 65*b*, the third side surface 65*c*, the fourth side surface 65*d* in the vertical direction Z.

The first side surface 65*a* of the present embodiment is an example of one-side surface. The second side surface 65*b*, the third side surface 65*c*, and the fourth side surface 65*d* of the present embodiment are examples of a plurality of side surfaces other than the one-side surface. The first side surface 65*a* and the third side surface 65*c* are substantially parallel to each other. The second side surface 65*b*, the third side surface 65*c*, and the fourth side surface 65*d* are substantially parallel to each other.

The first side surface 65*a* is provided separated from the third side surface 65*c* in the depth direction Y. The second side surface 65*b* and the fourth side surface 65*d* are located between the third side surface 65*c* and the first side surface 65*a* in the depth direction Y. That is, the first side surface 65*a*, the second side surface 65*b*, and the fourth side surface 65*d* are provided further forward than the third side surface 65*c*. The second side surface 65*b*, the third side surface 65*c*, and the fourth side surface 65*d* are provided deeper than the first side surface 65*a*.

The second side surface 65*b* is provided separated from the fourth side surface 65*d* in the width direction X. The first side surface 65*a* and the third side surface 65*c* are positioned between the fourth side surface 65*d* and the second side surface 65*b* in the width direction X.

The accommodation chamber 78 contains liquid. Specifically, the accommodation chamber 78 is capable of containing the liquid injected from the injection port 79. That is, the injection port 79 is provided for injection of liquid into the accommodation chamber 78. The first filter 69 may be detachably and attachably provided in the injection port 79.

The lid 83 is movable between a closed position indicated by a solid line in FIG. 1 and an opened position indicated by a two dot chain line in FIG. 1. When the lid 83 is provided so as to be pivotable around the back end, the liquid can be easily injected into the injection port 79 from the front side.

The lid 83 located in the closed position covers the injection port 79. The lid 83 located in the opened position exposes the injection port 79. The air open hole 84 may be formed in the lid 83. The air open hole 84 opens the inside of the accommodation chamber 78 to the atmosphere.

The injection port 79 of the present embodiment is provided in the top surface 65*e*. The injection port 79 may be provided at a position further toward the first side surface 65*a* than is the center of the top surface 65*e*. With respect to the depth direction Y, the interval between the injection port 79 and the first side surface 65*a* is smaller than the interval between the injection port 79 and the third side surface 65*c*. An interval between the injection port 79 and the first side surface 65*a* in the depth direction Y is smaller than an interval between the injection port 79 and the second side surface 65*b* and an interval between the injection port 79 and the fourth side surface 65*d* in the width direction X.

The outlet 80 of the present embodiment is provided on the lower surface 65*f*. The outlet 80 may be provided at a position further toward the third side surface 65*c* than is the center of the lower surface 65*f*. In the depth direction Y, an interval between the outlet 80 and the third side surface 65*c* is smaller than an interval between the outlet 80 and the first side surface 65*a*. An interval between the outlet 80 and the third side surface 65*c* in the depth direction Y is smaller than an interval between the outlet 80 and the second side surface 65*b* and an interval between the outlet 80 and the fourth side surface 65*d* in the width direction X.

The liquid accommodation vessel 65 may be formed of a transparent or translucent member. A portion of the liquid accommodation vessel 65 exposed from the holder 66 serves as the visual check section 81 through which a liquid level 86 of the liquid in the liquid accommodation vessel 65 is visible. The visual check section 81 is provided on at least the one-side surface of a plurality of side surfaces of the liquid accommodation vessel 65. The liquid accommodation vessel 65 may include a plurality of visual check sections 81. In the liquid accommodation vessel 65 of the present embodiment, the first side surface 65*a* and the third side surface 65*c* are provided with the visual check section 81.

The gauge 82 may be provided in at least one visual check section 81. The gauge 82 may be protrusions formed on the visual check section 81. The gauge 82 may be recesses formed in the visual check section 81, may be printed lines or marks, or may be formed by attaching stickers or the like.

Action and Effect

When liquid is to be injected into the liquid container 14, the user moves the lid 83 into the opened position. The user injects the liquid through the injection port 79. At this time, when the user injects the liquid from the front side of the liquid container 14, the injection of the liquid can be performed while checking the visual check section 81 and the connection state of the coupling section 64 and the coupler 13.

The injected liquid passes through the first filter 69 and is contained in the accommodation chamber 78. Foreign matter such as dust contained in the liquid is captured by the first filter 69. The liquid stored in the accommodation chamber 78 flows out from the outlet 80 to the coupling section 64, and is led out from the lead-out section 72 via the flow path 73. The led out liquid is sent to the liquid ejection section 18 via the coupler 13.

The effects of this embodiment will be described.

(1) The liquid container 14 can be installed at a position separate from the liquid ejector 12. That is, the liquid container 14 is placed outside the liquid ejector 12. Therefore, the liquid container 14 can increase the capacity of the accommodation chamber 78. Therefore, it is possible to increase the amount of the liquid to be injected into the accommodation chamber 78 at one time and to reduce the frequency of injecting the liquid.

(2) The circuit board 68 is coupled to the circuit board coupler 61 via the coupling terminal 70. Therefore, the state of the coupling status between the liquid container 14 and the coupler 13 can be grasped by the presence or absence of electrical coupling between the circuit board 68 and the circuit board coupler 61.

(3) The lead-out section 72 is provided in the adapter 74 and is coupled to the liquid accommodation vessel 65 via the flow path 73. Therefore, it is possible to increase the degree of freedom in the position of the lead-out section 72 with respect to the liquid accommodation vessel 65.

(4) The circuit board 68 includes the coupling terminal 70. The circuit board 68 is provided in the adapter 74. Therefore, the circuit board 68 can be easily coupled to the circuit board coupler 61 by mounting the adapter 74 to the coupler 13.

(5) In a state where the liquid container 14 is coupled to the coupler 13, the circuit board 68 is arranged at a position higher than the lead-out section 72. Therefore, for example, even when the liquid drips from the lead-out section 72, it is possible to reduce the possibility that the liquid adheres to the circuit board 68.

(6) The coupling section 64 is coupled to a lower portion of the liquid accommodation vessel 65. Therefore, for example, compared to a case where the coupling section 64 is coupled to the upper portion of the liquid accommodation vessel 65, it is possible to reduce the amount of liquid remaining in the liquid accommodation vessel 65.

(7) The first filter 69 is detachably attached to the injection port 79. Therefore, the first filter 69 can be easily replaced.

(8) The liquid container 14 includes the gripping section 67. Therefore, the liquid container 14 can be easily moved.

(9) The coupling section 64 includes the flow path 73 capable of coupling the inlet 76 and the adapter 74 to each other.

Therefore, the coupling section 64 can easily couple the liquid accommodation vessel 65 to the coupler 13. Therefore, it is possible to supply liquid to the liquid ejector 12 from the liquid accommodation vessel 65 that is installed at a position separated from the liquid ejector 12 via the coupler 13.

Modifications

The present embodiment can be carried out with the following modifications. The present embodiment and the following modifications can be implemented in combination with each other within a technically consistent range.

First Modification

Figure 2:
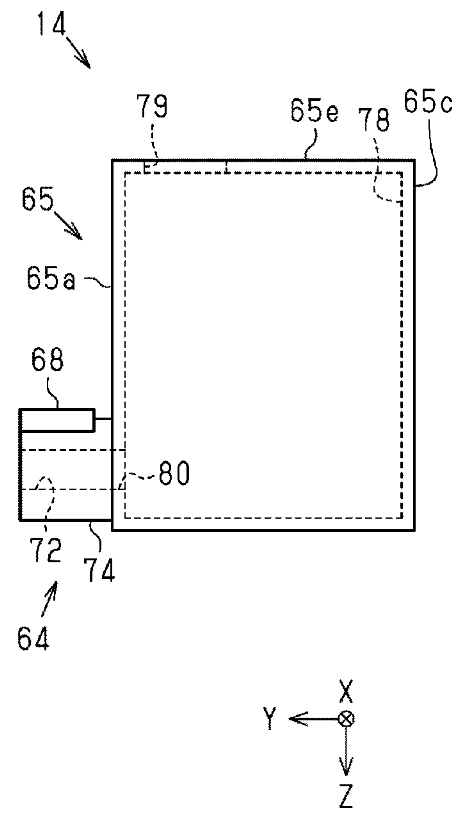
FIG. 2 is a schematic side view of a first modification of the liquid container.
Figure 3:
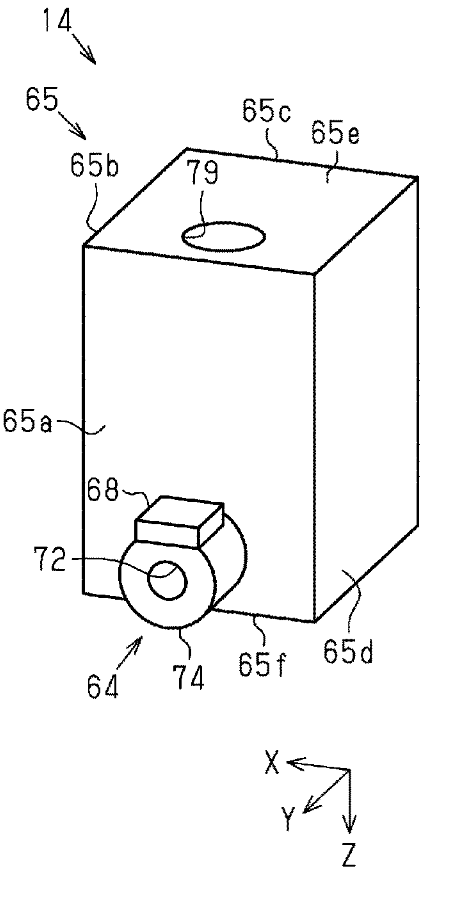
FIG. 3 is a schematic perspective view of the first modification of the liquid container.

As shown in FIGS. 2 and 3, the liquid container 14 may include the liquid accommodation vessel 65 and the coupling section 64. The liquid container 14 may include the circuit board 68. The outlet 80 may be provided in the first side surface 65*a*. The coupling section 64 may be constituted by the adapter 74 attached to the first side surface 65*a*. The lead-out section 72 may be directly coupled to the outlet 80. The circuit board 68 may be provided in the coupling section 64. By coupling the coupling section 64 to the coupler 13, the circuit board 68 can be easily coupled to the circuit board coupler 61.

The liquid accommodation vessel 65 may include the top surface 65*e* in which the injection port 79 is provided, the first side surface 65*a* which is an example of the one-side surface facing a direction in which the lead-out section 72 opens, and the second side surface 65*b*, the third side surface 65*c*, and the fourth side surface 65*d*, which are examples of a plurality of other side surfaces different from the one-side surface. The injection port 79 may be provided at a position further toward the first side surface 65*a* than is the center of the top surface 65*e*. As a result, the user can inject liquid while checking the connection state between the lead-out section 72 and the coupler 13, so that even if there is a connection failure, the user can easily grasp it. In a state in which the liquid container 14 is coupled to the coupler 13, the circuit board 68 may be arranged at a position higher than the lead-out section 72.

Second Modification

Figure 4:
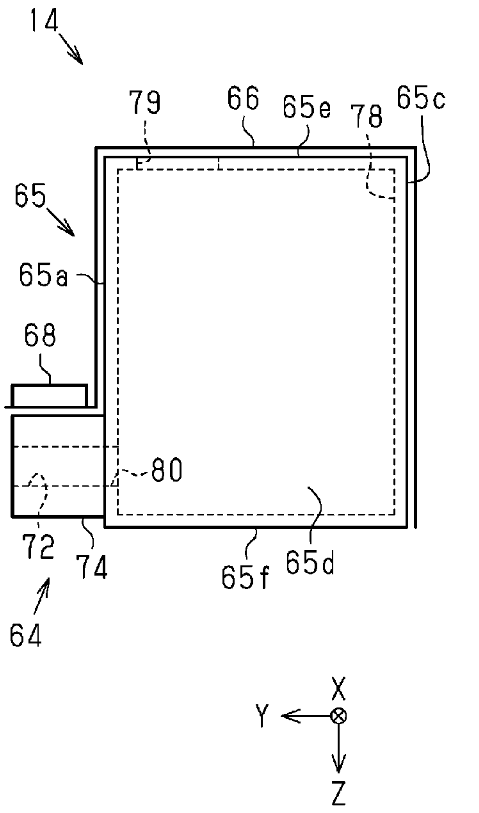
FIG. 4 is a schematic side view of a second modification of the liquid container.

As shown in FIG. 4, the holder 66 may be attached to both the liquid accommodation vessel 65 and the coupling section 64. The circuit board 68 may be provided on the holder 66. The circuit board 68 is provided at a position separated from the lead-out section 72 of the coupling section 64. Therefore, for example, even when the liquid drips from the lead-out section 72, the risk of the liquid adhering to the circuit board 68 can be reduced. In a state in which the liquid container 14 is coupled to the coupler 13, the circuit board 68 may be arranged at a position higher than the lead-out section 72.

Third Modification

Figure 5:
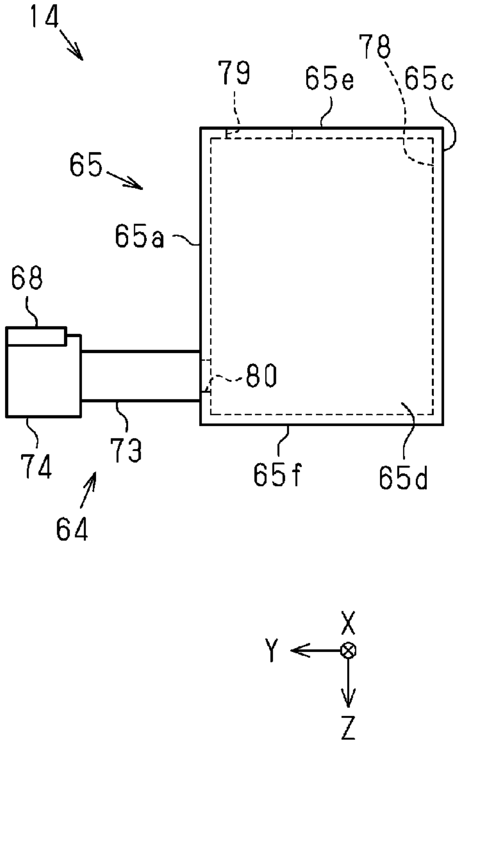
FIG. 5 is a schematic side view of a third modification of the liquid container.
Figure 6:
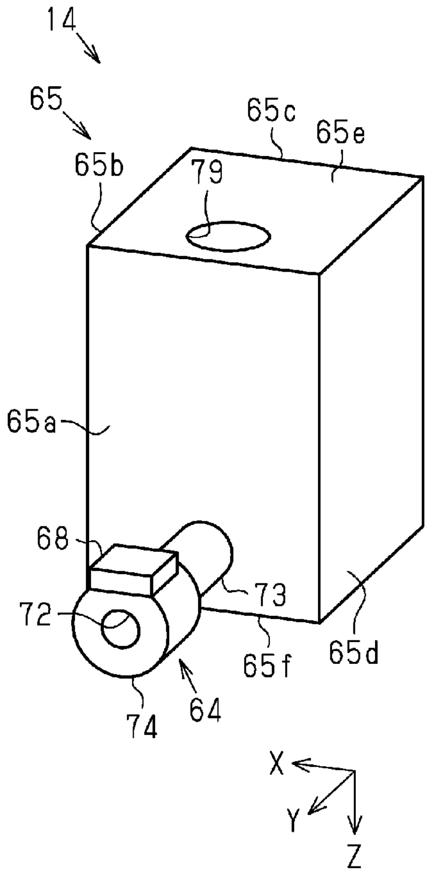
FIG. 6 is a schematic perspective view of the third modification of the liquid container.

As shown in FIGS. 5 and 6, the coupling section 64 may include the flow path 73 and the adapter 74. The liquid container 14 may include the circuit board 68. The upstream end of the flow path 73 may be coupled to the outlet 80 formed in the first side surface 65*a*. The circuit board 68 may be provided in the coupling section 64. The liquid accommodation vessel 65 may include the top surface 65*e* in which the injection port 79 is provided, the first side surface 65*a* which is an example of one-side surface that is a side surface closest to a position to which the flow path 73 is coupled, and the second side surface 65*b*, the third side surface 65*c*, and the fourth side surface 65*d*, which are examples of a plurality of side surfaces different from the first side surface 65*a*. The injection port 79 may be provided at a position further toward the first side surface 65*a* than is the center of the top surface 65*e*. As a result, the user can inject the liquid while checking the connection state between the liquid accommodation vessel 65 and flow path 73, so that even if there is a connection failure, the user can easily grasp it. In a state in which the liquid container 14 is coupled to the coupler 13, the circuit board 68 may be arranged at a position higher than the lead-out section 72.

Fourth Modification

Figure 7:
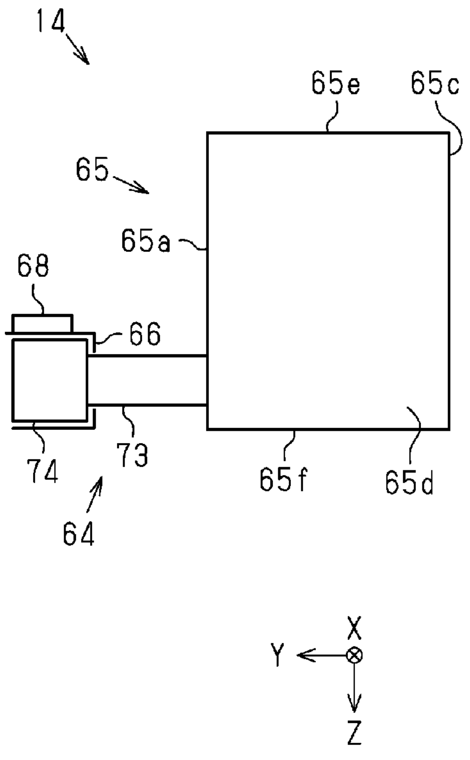
FIG. 7 is a schematic side view of a fourth modification of the liquid container.

As shown in FIG. 7, the holder 66 may be attached to the coupling section 64. For example, the holder 66 may be attached to the adapter 74. The circuit board 68 may be provided on the holder 66. In a state in which the liquid container 14 is coupled to the coupler 13, the circuit board 68 may be arranged at a position higher than the lead-out section 72.

Fifth Modification

Figure 8:
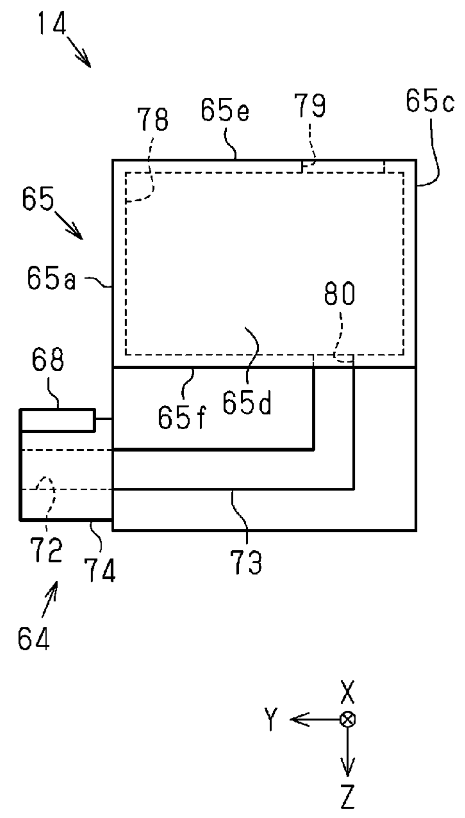
FIG. 8 is a schematic side view of a fifth modification of the liquid container.
Figure 9:
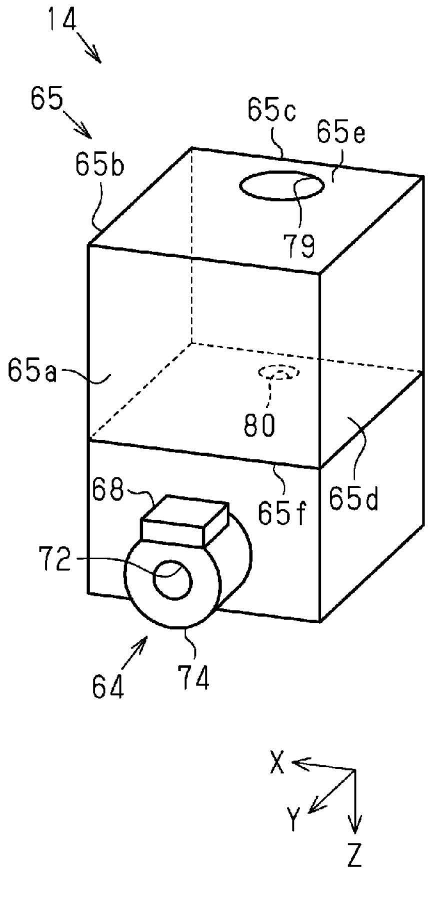
FIG. 9 is a schematic perspective view of the fifth modification of the liquid container.

As shown in FIGS. 8 and 9, the liquid accommodation vessel 65 may include the top surface 65*e* on which the injection port 79 is provided. The liquid accommodation vessel 65 may include the third side surface 65*c*, which is an example of the one-side surface closest to the position to which the flow path 73 is coupled, and the first side surface 65*a*, the second side surface 65*b*, and the fourth side surface 65*d*, which are an example of a plurality of other side surfaces different from the one-side surface. The injection port 79 may be provided at a position further toward the third side surface 65*c* than is the center of the top surface 65*e*.

Sixth Modification

Figure 10:
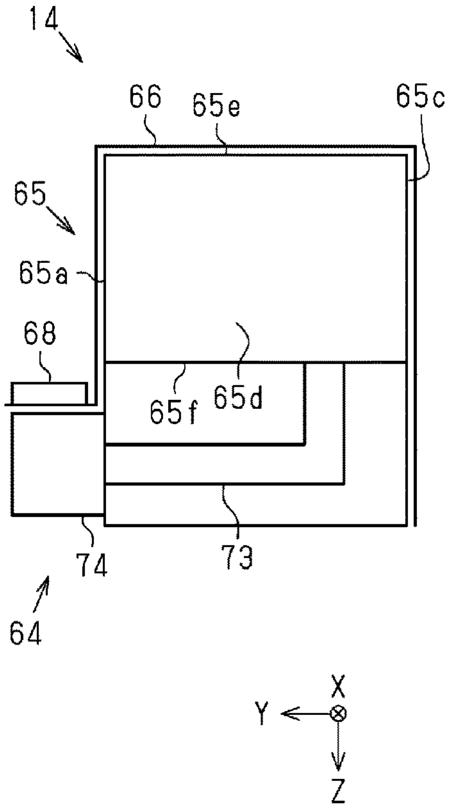
FIG. 10 is a schematic side view of a sixth modified example of the liquid container.

As shown in FIG. 10, the holder 66 may be attached to both the liquid accommodation vessel 65 and the coupling section 64. The circuit board 68 may be provided on the holder 66.

Seventh Modification

Figure 11:
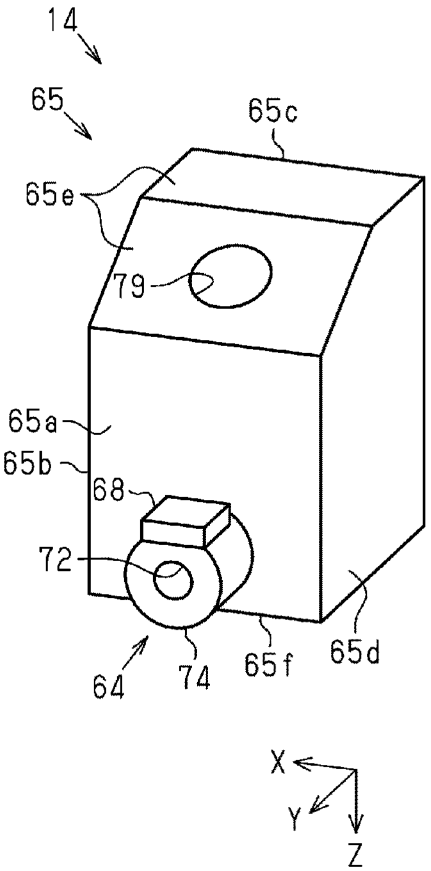
FIG. 11 is a schematic perspective view of a seventh modification of the liquid container.

As shown in FIG. 11, the top surface 65*e* may include a plurality of surfaces. Each surface may be a flat surface or may be a curved surface. Each surface may be a horizontal surface or may be an inclined surface sloped with respect to a horizontal surface. Of the plurality of surfaces constituting the top surface 65*e*, the injection port 79 may be provided in a surface adjacent to the first side surface 65*a*, which is an example of a side surface facing the direction in which the lead-out section 72 opens. When the injection port 79 is formed in an inclined surface in which the front side in the depth direction Y slants downward, the user can easily inject the liquid into the liquid accommodation vessel 65 from the front position.

Eighth Modification

Figure 12:
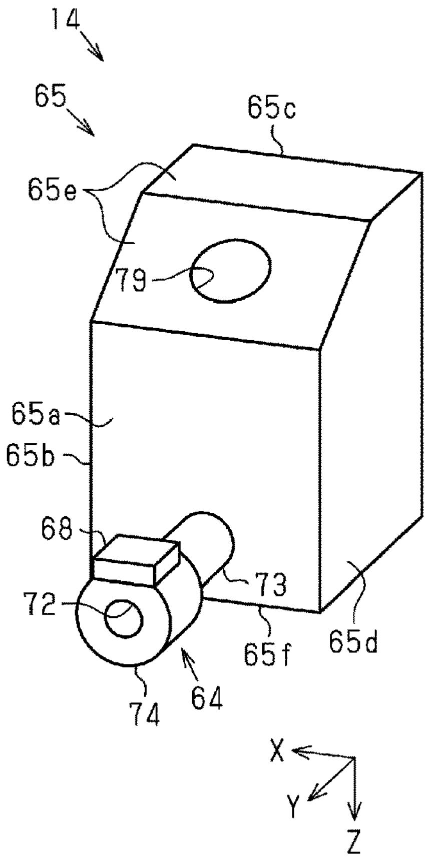
FIG. 12 is a schematic perspective view of an eighth modification of the liquid container.

As shown in FIG. 12, of the plurality of surfaces constituting the top surface 65*e*, the injection port 79 may be provided on a surface adjacent to the first side surface 65*a*, which is an example of a surface that is closest to a position where the flow path 73 is coupled.

Ninth Modification

Figure 13:
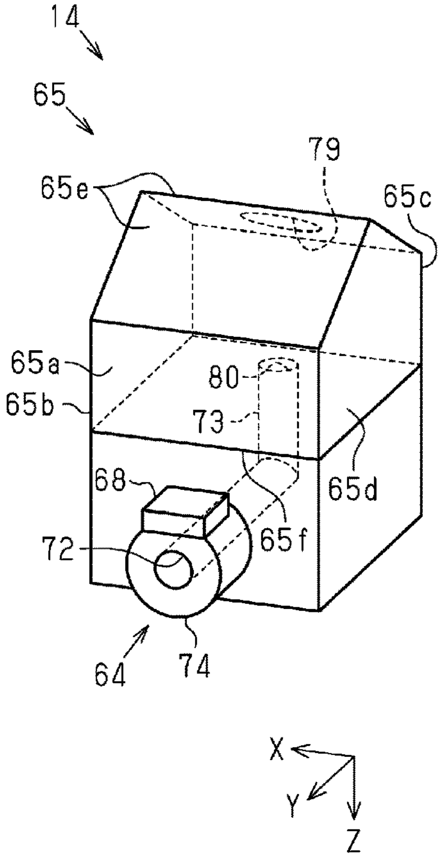
FIG. 13 is a schematic perspective view of a ninth modification of the liquid container.

As shown in FIG. 13, of the plurality of surfaces constituting the top surface 65*e*, the injection port 79 may be provided on a surface adjacent to the third side surface 65*c* which is an example of a surface that is closest to a position where the flow path 73 is coupled. When the injection port 79 is formed on an inclined surface whose back in the depth direction Y is lowered, a user can easily inject the liquid into the liquid accommodation vessel 65 from a back position.

Tenth Modification

Figure 14:
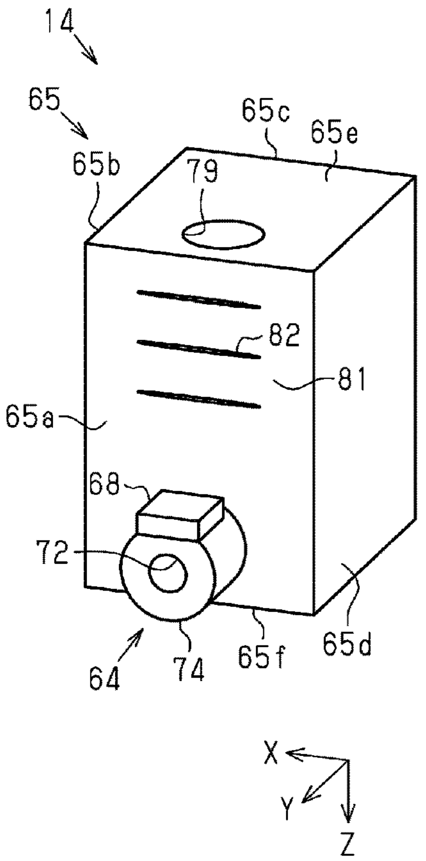
FIG. 14 is a schematic perspective view of a tenth modification of the liquid container.

As shown in FIG. 14, the visual check section 81 may be provided on the first side surface 65*a*, which is an example of a side surface facing a direction in which the lead-out section 72 opens. Since the visual check section 81 is provided on the first side surface 65*a*, the user can inject the liquid while viewing the liquid level 86 from the visual check section 81.

Eleventh Modification

Figure 15:
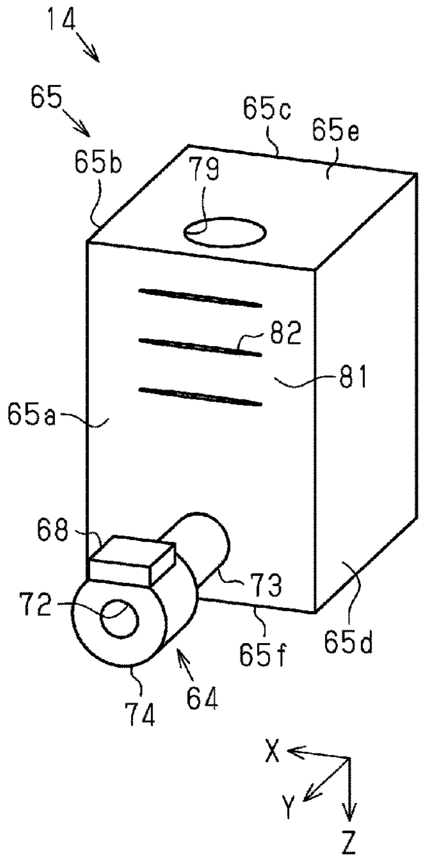
FIG. 15 is a schematic perspective view of an eleventh modification of the liquid container.

As shown in FIG. 15, the visual check section 81 may be provided on the first side surface 65*a*, which is an example of the side surface closest to a position where the flow path 73 is coupled.

Twelfth Modification

Figure 16:
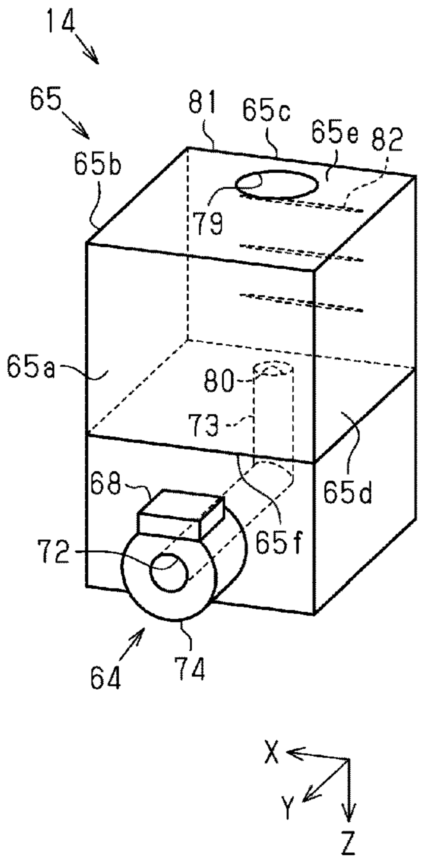
FIG. 16 is a schematic perspective view of a twelfth modification of the liquid container.

As shown in FIG. 16, the visual check section 81 may be provided on the third side surface 65*c*, which is an example of a side surface closest to a position where the flow path 73 is coupled.

Thirteenth Modification

Figure 17:
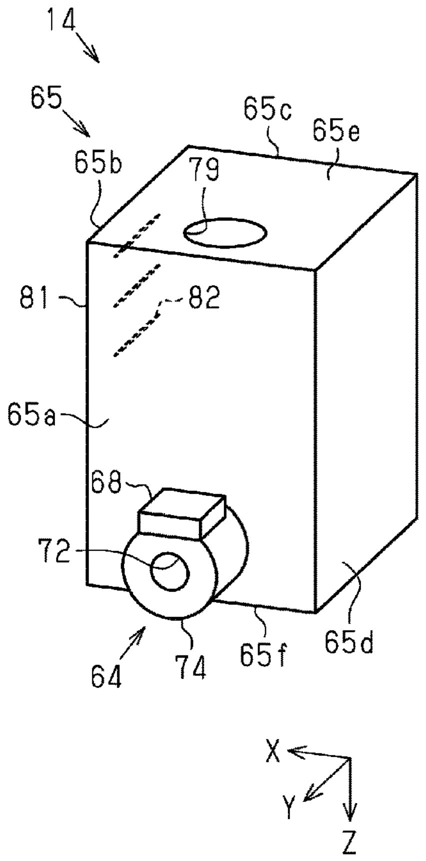
FIG. 17 is a schematic perspective view of a thirteenth modification of the liquid container.

As shown in FIG. 17, the visual check section 81 may be provided in at least the one-side surface of the second side surface 65*b*, the third side surface 65*c*, and the fourth side surface 65*d*, which are examples of a plurality of side surfaces, which are different from the first side surface 65*a*, which faces in a direction in which the lead-out section 72 opens. The visual check section 81 may be provided in the second side surface 65*b*.

Since the visual check section 81 is provided in a side surface other than the first side surface 65*a*, for example, the risk of the liquid adhering to the visual check section 81 can be reduced even in a case where liquid drips from the injection port 79. The visual check section 81 may be provided in the second side surface 65*b* and the third side surface 65*c*. The visual check section 81 may be provided in the second side surface 65*b* and the fourth side surface 65*d*. The visual check section 81 may be provided in the third side surface 65*c* and the fourth side surface 65*d*. The visual check section 81 may be provided in the second side surface 65*b*, the third side surface 65*c*, and the fourth side surface 65*d*.

Fourteenth Modification

Figure 18:
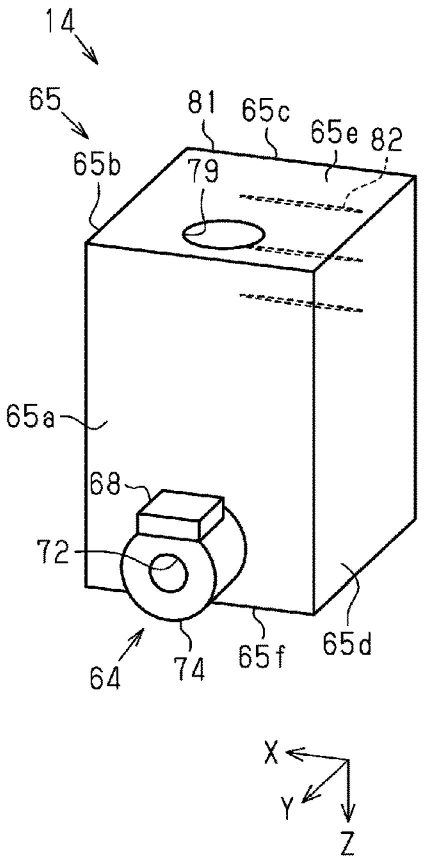
FIG. 18 is a schematic perspective view of a fourteenth modification of the liquid container.

As shown in FIG. 18, the visual check section 81 may be provided on the third side surface 65*c*, which is different from the first side surface 65*a*, which faces the direction in which the lead-out section 72 opens.

Fifteenth Modification

Figure 19:
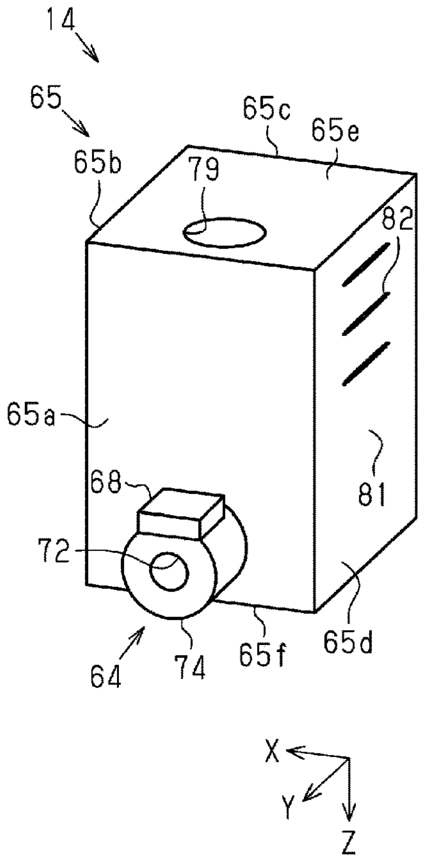
FIG. 19 is a schematic perspective view of a fifteenth modification of the liquid container.

As shown in FIG. 19, the visual check section 81 may be provided on the fourth side surface 65*d*, which is different from the first side surface 65*a*, which faces the direction in which the lead-out section 72 opens.

Sixteenth Modification

Figure 20:
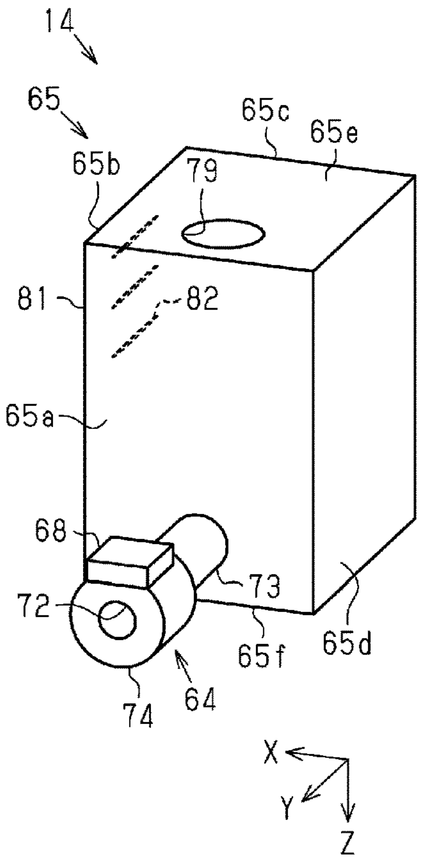
FIG. 20 is a schematic perspective view of a sixteenth modification of the liquid container.

As shown in FIG. 20, the visual check section 81 may be provided on at least the one-side surface of the second side surface 65*b*, the third side surface 65*c*, and the fourth side surface 65*d*, which are examples of a plurality of side surfaces different from the first side surface 65*a*, which is the side surface closest to the position where the flow path 73 is coupled. The visual check section 81 may be provided in the second side surface 65*b*. The visual check section 81 may be provided in the second side surface 65*b* and the third side surface 65*c*. The visual check section 81 may be provided in the second side surface 65*b* and the fourth side surface 65*d*. The visual check section 81 may be provided in the third side surface 65*c* and the fourth side surface 65*d*. The visual check section 81 may be provided in the second side surface 65*b*, the third side surface 65*c*, and the fourth side surface 65*d*.

Seventeenth Modification

Figure 21:
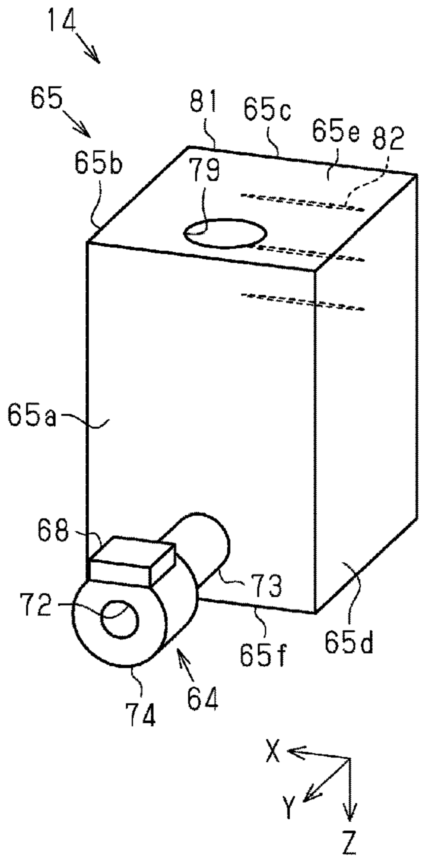
FIG. 21 is a schematic perspective view of a seventeenth modification of the liquid container.

As shown in FIG. 21, the visual check section 81 may be provided in the third side surface 65*c*, which is different from the first side surface 65*a*, which is the side surface closest to the position where the flow path 73 is coupled.

Eighteenth Modification

Figure 22:
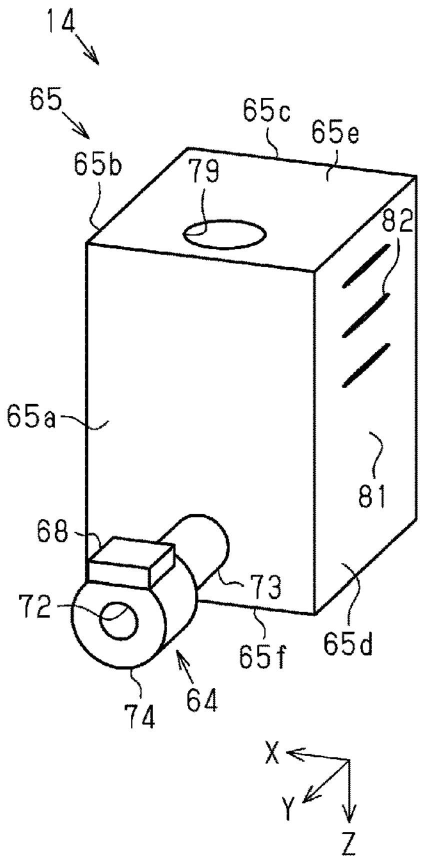
FIG. 22 is a schematic perspective view of an eighteenth modification of the liquid container.

As shown in FIG. 22, the visual check section 81 may be provided on the fourth side surface 65*d*, which is different from the first side surface 65*a*, which is the side surface closest to the position where the flow path 73 is coupled.

Nineteenth Modification

Figure 23:
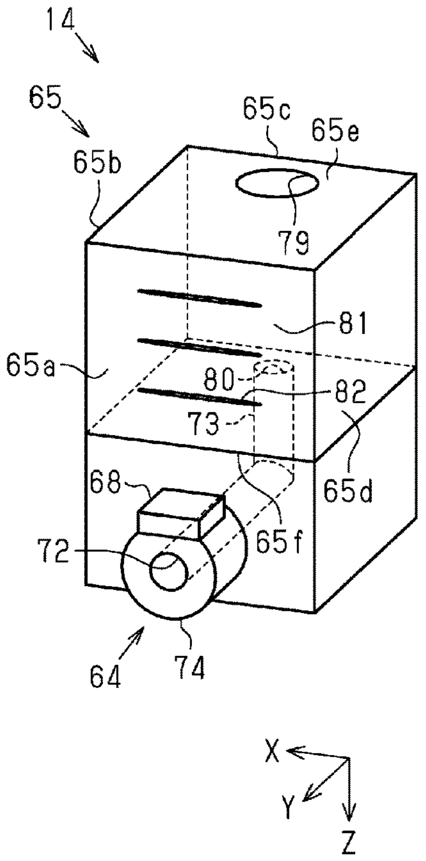
FIG. 23 is a schematic perspective view of a nineteenth modification of the liquid container.

As shown in FIG. 23, the visual check section 81 may be provided on at least one-side surface of the first side surface 65*a*, the second side surface 65*b*, and the fourth side surface 65*d*, which are examples of a plurality of side surfaces different from the third side surface 65*c*, which is the closest to the position where the flow path 73 is coupled. The visual check section 81 may be provided on the first side surface 65*a*. The visual check section 81 may be provided on the first side surface 65*a* and the second side surface 65*b*. The visual check section 81 may be provided on the first side surface 65*a* and the fourth side surface 65*d*. The visual check section 81 may be provided in the second side surface 65*b* and the fourth side surface 65*d*. The visual check section 81 may be provided on the first side surface 65*a*, the second side surface 65*b*, and the fourth side surface 65*d*.

Twentieth Modification

Figure 24:
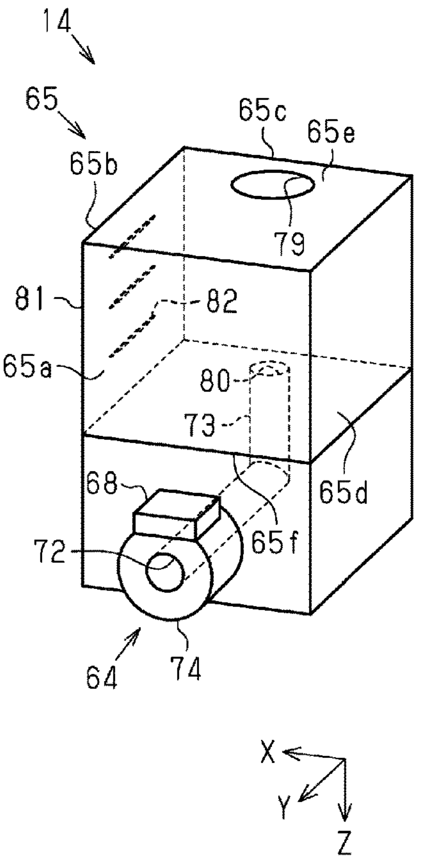
FIG. 24 is a schematic perspective view of a twentieth modification of the liquid container.

As shown in FIG. 24, the visual check section 81 may be provided on the second side surface 65*b*, which is different from the third side surface 65*c*, which is the side surface closest to the position where the flow path 73 is coupled.

Twenty-First Modification

Figure 25:
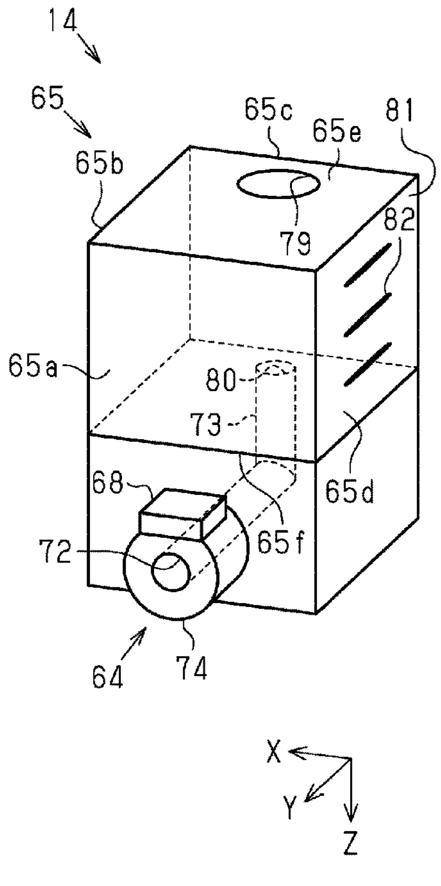
FIG. 25 is a schematic perspective view of a twenty-first modification of the liquid container.

As shown in FIG. 25, the visual check section 81 may be provided on the fourth side surface 65*d*, which is different from the third side surface 65*c*, which is the side surface closest to the position where the flow path 73 is coupled.

Twenty-Second Modification

Figure 26:
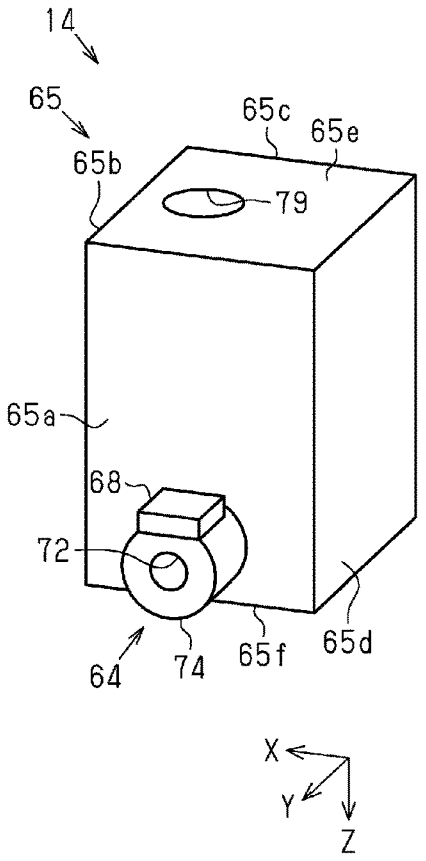
FIG. 26 is a schematic perspective view of a twenty-second modification of the liquid container.

As shown in FIG. 26, the liquid accommodation vessel 65 may include the second side surface 65*b*, the third side surface 65*c*, and the fourth side surface 65*d*, which are different from the first side surface 65*a*, which faces the direction in which the lead-out section 72 opens. The injection port 79 may be provided further toward at least one-side surface among the second side surface 65*b*, the third side surface 65*c*, and the fourth side surface 65*d*, than is the center of the top surface 65*e*. The injection port 79 may be provided further toward the second side surface 65*b* than is the center of the top surface 65*e*. Accordingly, since the user can inject the liquid from a side different from a side where the lead-out section 72 and the coupler 13 are coupled, an area around the injection port 79 for injecting the liquid is easily secured. The injection port 79 may be provided further toward the second side surface 65*b* and the third side surface 65*c* than is the center of the top surface 65*e*. The injection port 79 may be provided further toward the third side surface 65*c* and the fourth side surface 65*d* than is the center of the top surface 65*e*.

Twenty-Third Modification

Figure 27:
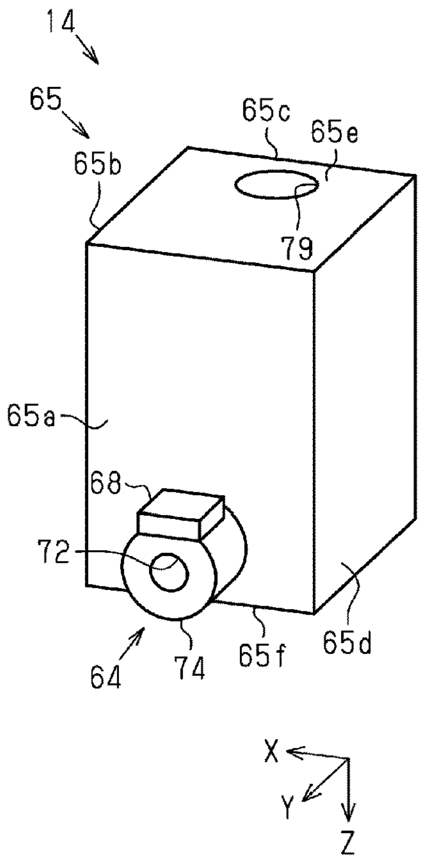
FIG. 27 is a schematic perspective view of a twenty-third modification of the liquid container.

As shown in FIG. 27, the injection port 79 may be provided further toward the third side surface 65*c* than is the center of the top surface 65*e*.

Twenty-Fourth Modification

Figure 28:
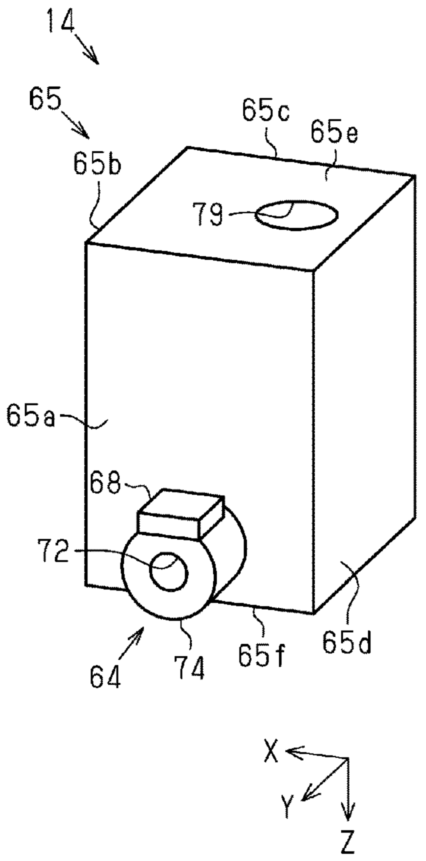
FIG. 28 is a schematic perspective view of a twenty-fourth modification of the liquid container.

As shown in FIG. 28, the injection port 79 may be provided further toward the fourth side surface 65*d* than is the center of the top surface 65*e*.

Twenty-Fifth Modification

Figure 29:
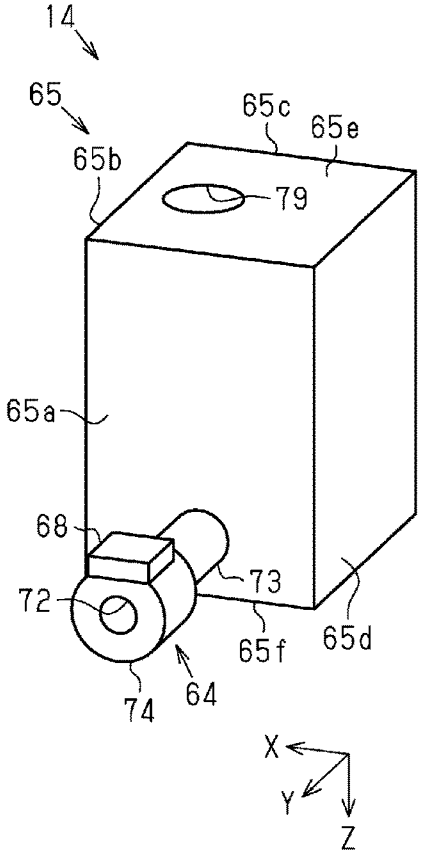
FIG. 29 is a schematic perspective view of a twenty-fifth modification of the liquid container.

As shown in FIG. 29, the liquid accommodation vessel 65 may include the second side surface 65*b*, the third side surface 65*c*, and the fourth side surface 65*d*, which are different from the first side surface 65*a*, which is the side surface closest to the position where the flow path 73 is coupled. The injection port 79 may be provided further toward at least one-side surface among the second side surface 65*b*, the third side surface 65*c*, and the fourth side surface 65*d*, than is the center of the top surface 65*e*. The injection port 79 may be provided further toward the second side surface 65*b* than is the center of the top surface 65*e*. Accordingly, since the user can inject the liquid from a side different from the side where the liquid accommodation vessel 65 and the flow path 73 are coupled, it is easy to secure an area around the injection port 79 for injecting the liquid. The injection port 79 may be provided further toward the second side surface 65*b* and the third side surface 65*c* than is the center of the top surface 65*e*. The injection port 79 may be provided further toward the third side surface 65*c* and the fourth side surface 65*d* than is the center of the top surface 65*e*.

Twenty-Sixth Modification

Figure 30:
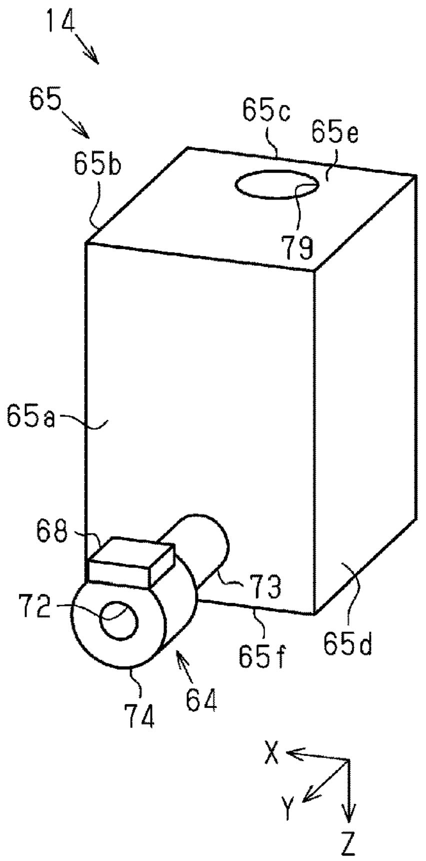
FIG. 30 is a schematic perspective view of a twenty-sixth modification of the liquid container.

As shown in FIG. 30, the injection port 79 may be provided further toward the third side surface 65*c* than is the center of the top surface 65*e*.

Twenty-Seventh Modification

Figure 31:
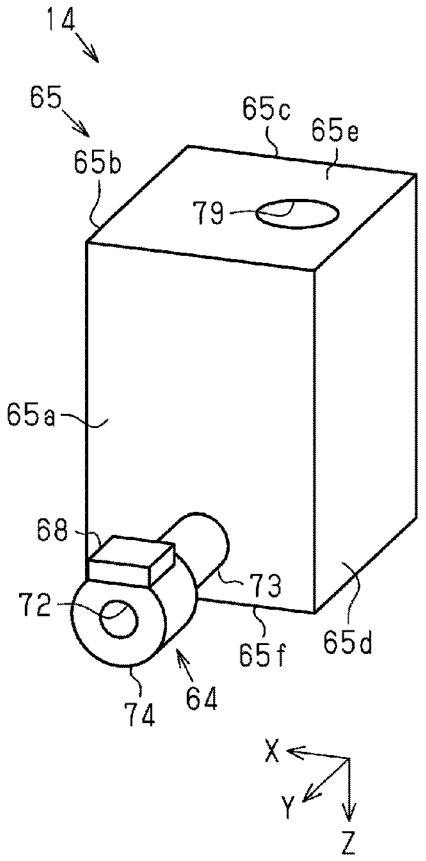
FIG. 31 is a schematic perspective view of a twenty-seventh modification of the liquid container.

As shown in FIG. 31, the injection port 79 may be provided further toward the fourth side surface 65*d* than is the center of the top surface 65*e*.

Twenty-Eighth Modification

Figure 32:
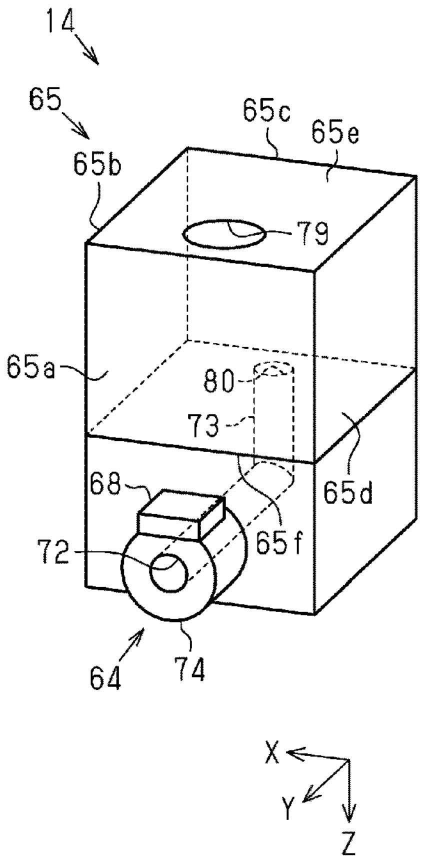
FIG. 32 is a schematic perspective view of a twenty-eighth modification of the liquid container.

As shown in FIG. 32, the liquid accommodation vessel 65 may include the first side surface 65*a*, the second side surface 65*b*, and the fourth side surface 65*d*, which are different from the third side surface 65*c*, which is the side surface closest to the position where the flow path 73 is coupled. The injection port 79 may be provided further toward at least one of the first side surface 65*a*, the second side surface 65*b*, and the fourth side surface 65*d* than is the center of the top surface 65*e*. The injection port 79 may be provided further toward the first side surface 65*a* than is the center of the top surface 65*e*. The injection port 79 may be provided further toward the first side surface 65*a* and the second side surface 65*b* than is the center of the top surface 65*e*. The injection port 79 may be provided further toward the first side surface 65*a* and the fourth side surface 65*d* than is the center of the top surface 65*e*.

Twenty-Ninth Modification

Figure 33:
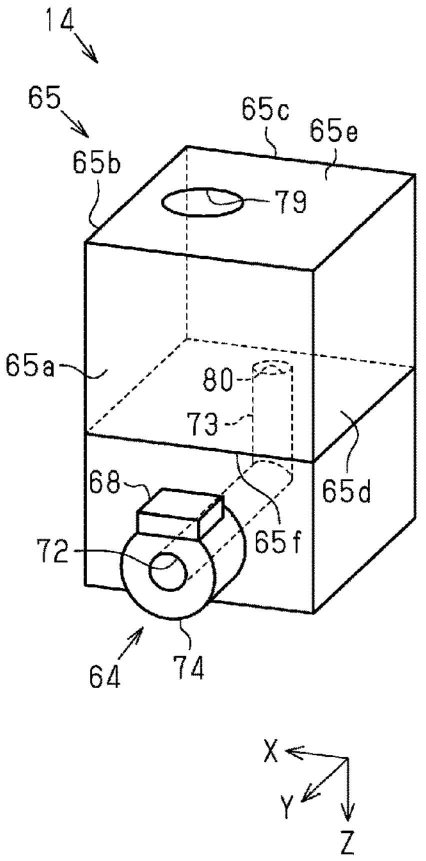
FIG. 33 is a schematic perspective view of a twenty-ninth modification of the liquid container.

As shown in FIG. 33, the injection port 79 may be provided further toward the second side surface 65*b* than is the center of the top surface 65*e*.

Thirtieth Modification

Figure 34:
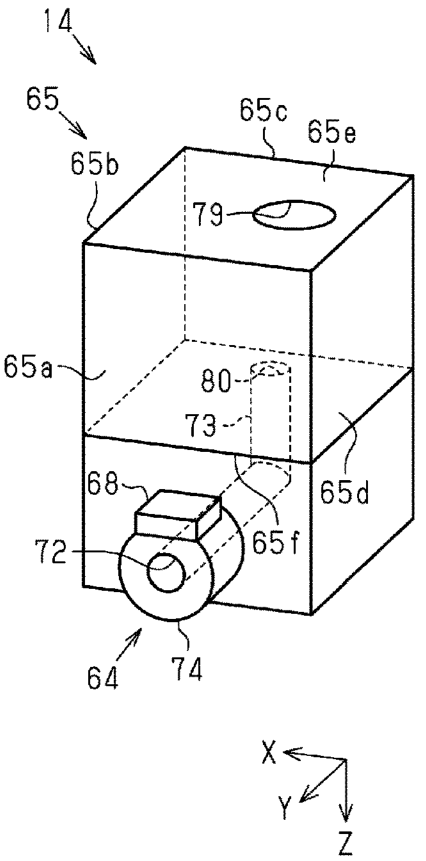
FIG. 34 is a schematic perspective view of a thirtieth modification of the liquid container.

As shown in FIG. 34, the injection port 79 may be provided further toward the fourth side surface 65*d* than is the center of the top surface 65*e*.

Thirty-First Modification

Figure 35:
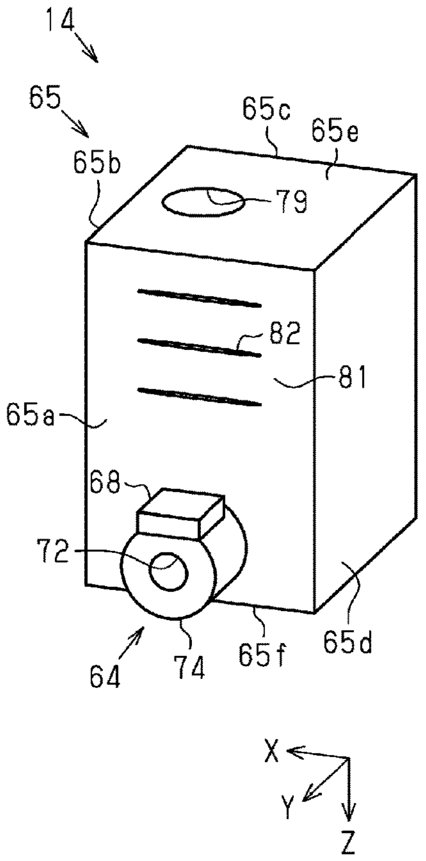
FIG. 35 is a schematic perspective view of a thirty-first modification of the liquid container.

As shown in FIG. 35, the liquid accommodation vessel 65 may include the visual check section 81 provided on the first side surface 65*a*, which faces the direction in which the lead-out section 72 opens. The injection port 79 may be provided further toward the second side surface 65*b* than is the center of the top surface 65*e*. Since the injection port 79 is provided further toward a side surface that is different from the first side surface 65*a* on which the visual check section 81 is provided, for example, even when liquid drips from the injection port 79, it is possible to reduce the risk that the liquid will adhere to the visual check section 81.

Thirty-Second Modification

Figure 36:
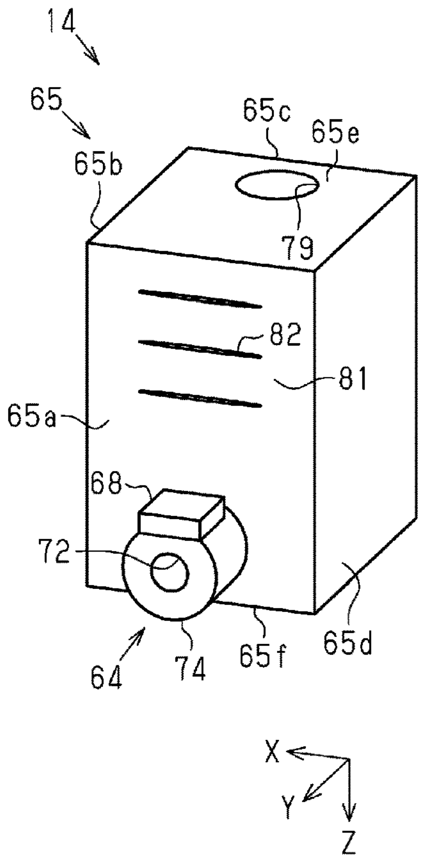
FIG. 36 is a schematic perspective view of a thirty-second modification of the liquid container.

As shown in FIG. 36, the liquid accommodation vessel 65 may include the visual check section 81 provided on the first side surface 65*a*, which faces the direction in which the lead-out section 72 opens. The injection port 79 may be provided further toward the third side surface 65*c* than is the center of the top surface 65*e*.

Thirty-Third Modification

Figure 37:
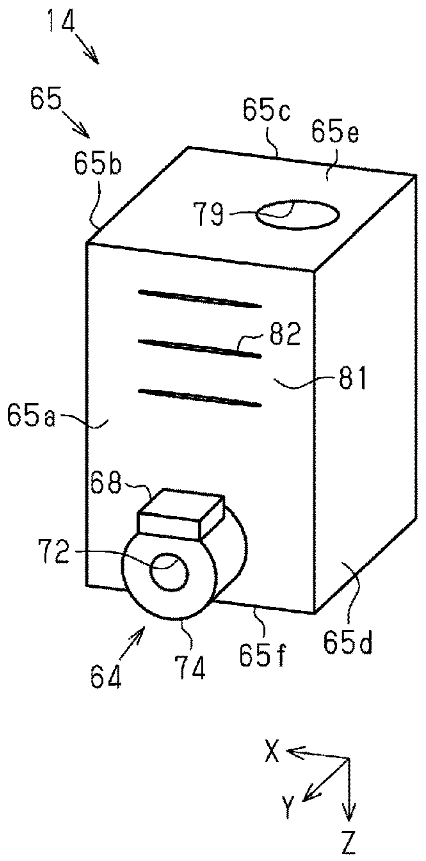
FIG. 37 is a schematic perspective view of a thirty-third modification of the liquid container.

As shown in FIG. 37, the liquid accommodation vessel 65 may include the visual check section 81 provided on the first side surface 65*a*, which faces the direction in which the lead-out section 72 opens. The injection port 79 may be provided further toward the fourth side surface 65*d* than is the center of the top surface 65*e*.

Thirty-Fourth Modification

Figure 38:
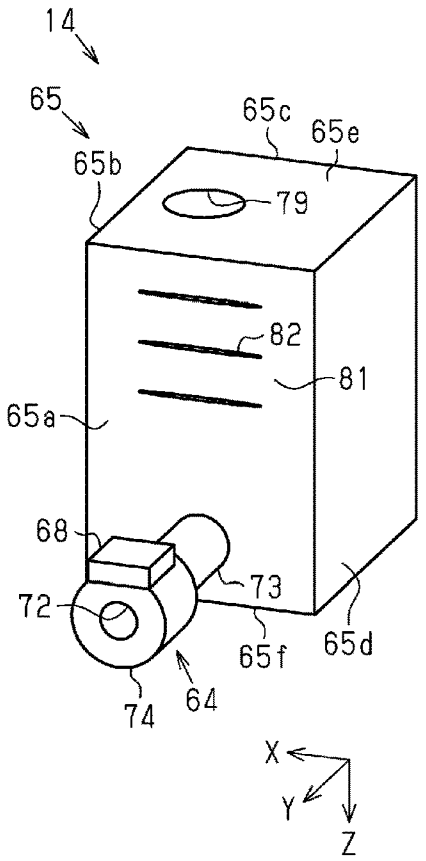
FIG. 38 is a schematic perspective view of a thirty-fourth modification of the liquid container.

As shown in FIG. 38, the liquid accommodation vessel 65 may include the visual check section 81 provided on the first side surface 65*a*, which is the side surface closest to the position where the flow path 73 is coupled. The injection port 79 may be provided further toward the second side surface 65*b* than is the center of the top surface 65*e*.

Thirty-Fifth Modification

Figure 39:
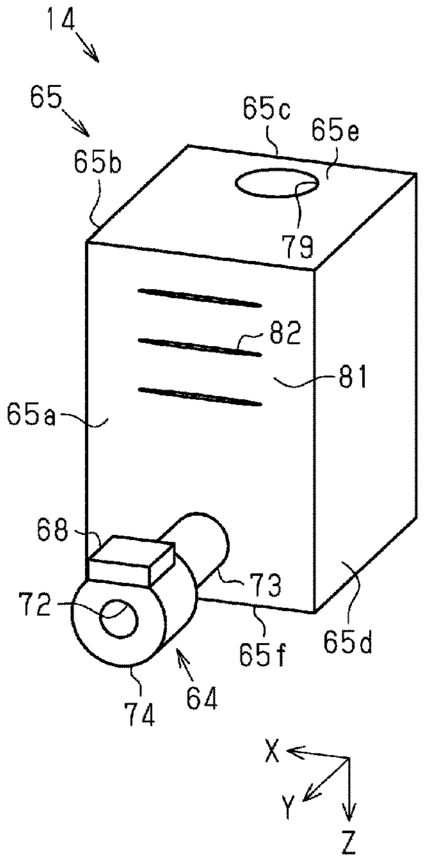
FIG. 39 is a schematic perspective view of a thirty-fifth modification of the liquid container.

As shown in FIG. 39, the liquid accommodation vessel 65 may include the visual check section 81 provided on the first side surface 65*a*, which is the side surface closest to the position where the flow path 73 is coupled. The injection port 79 may be provided further toward the third side surface 65*c* than is the center of the top surface 65*e*.

Thirty-Sixth Modification

Figure 40:
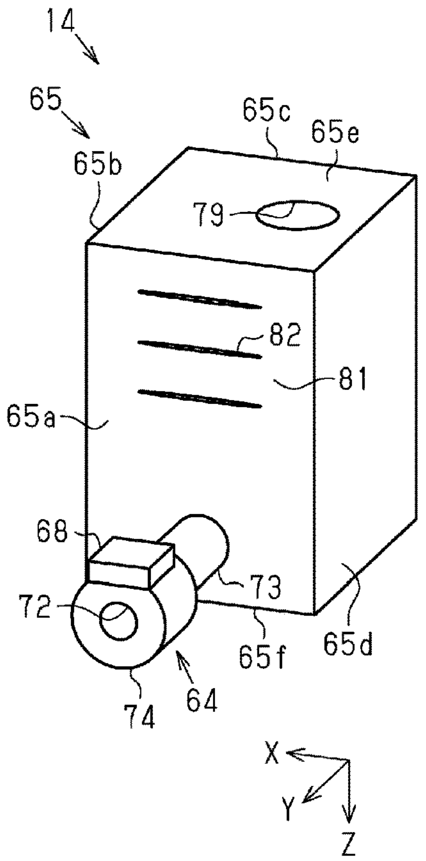
FIG. 40 is a schematic perspective view of a thirty-sixth modification of the liquid container.

As shown in FIG. 40, the liquid accommodation vessel 65 may include the visual check section 81 provided on the first side surface 65*a*, which is the side surface closest to the position where the flow path 73 is coupled. The injection port 79 may be provided further toward the fourth side surface 65*d* than is the center of the top surface 65*e*.

Thirty-Seventh Modification

Figure 41:
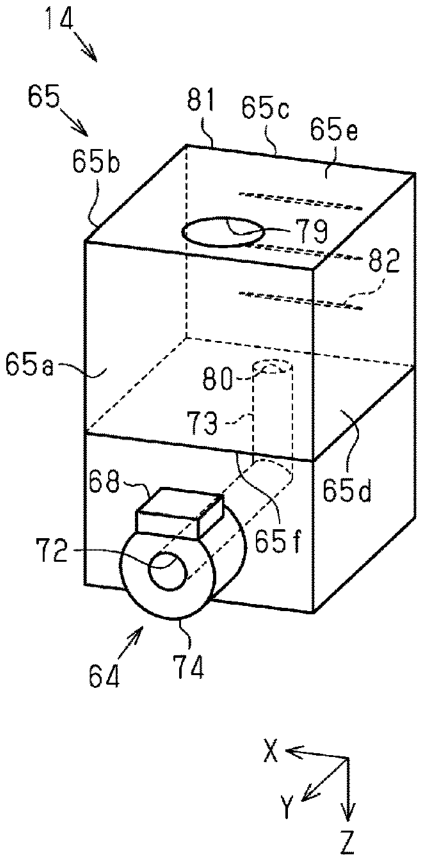
FIG. 41 is a schematic perspective view of a thirty-seventh modification of the liquid container.

As shown in FIG. 41, the liquid accommodation vessel 65 may include the visual check section 81 provided on the third side surface 65*c*, which is the side surface closest to the position where the flow path 73 is coupled. The injection port 79 may be provided further toward the first side surface 65*a* than is the center of the top surface 65*e*.

Thirty-Eighth Modification

Figure 42:
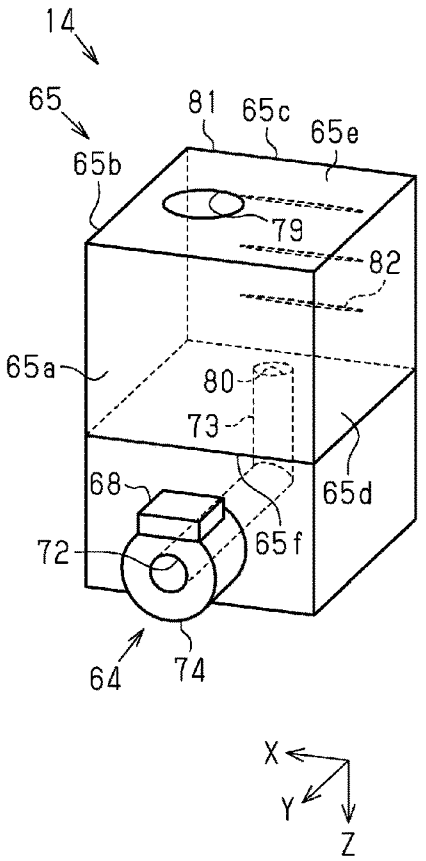
FIG. 42 is a schematic perspective view of a thirty-eighth modification of the liquid container.

As shown in FIG. 42, the liquid accommodation vessel 65 may include the visual check section 81 provided on the third side surface 65*c*, which is the side surface closest to the position where the flow path 73 is coupled. The injection port 79 may be provided further toward the second side surface 65*b* than is the center of the top surface 65*e*.

Thirty-Ninth Modification

Figure 43:
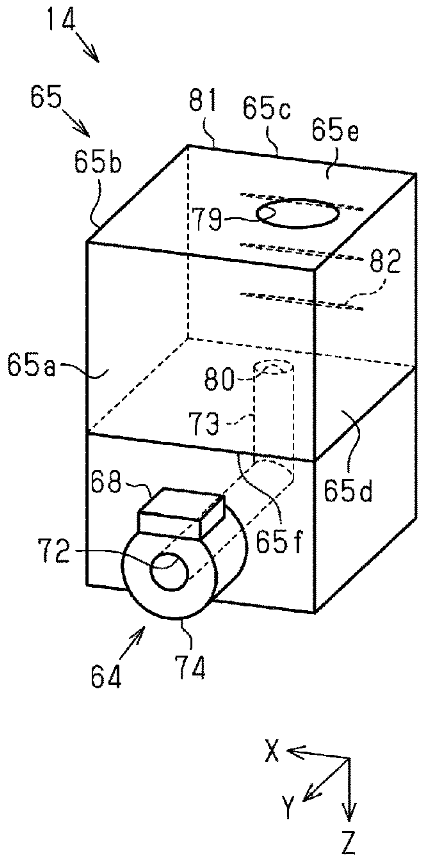
FIG. 43 is a schematic perspective view of a thirty-ninth modification of the liquid container.

As shown in FIG. 43, the liquid accommodation vessel 65 may include the visual check section 81 provided on the third side surface 65*c*, which is the side surface closest to the position where the flow path 73 is coupled. The injection port 79 may be provided further toward the fourth side surface 65*d* than is the center of the top surface 65*e*.

Fortieth Modification

Figure 44:
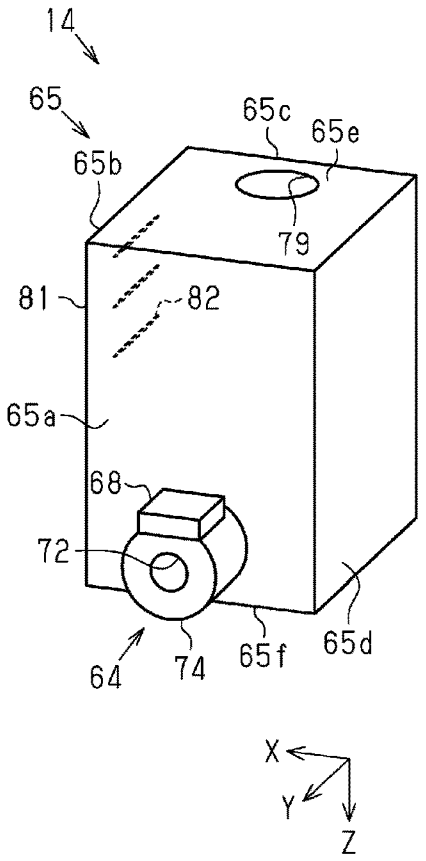
FIG. 44 is a schematic perspective view of a fortieth modification of the liquid container.

As shown in FIG. 44, the liquid accommodation vessel 65 may include the visual check section 81 provided on the second side surface 65*b*, which is different from the first side surface 65*a*, which faces the direction in which the lead-out section 72 opens. The injection port 79 may be provided further toward the third side surface 65*c* than is the center of the top surface 65*e*.

Forty-First Modification

Figure 45:
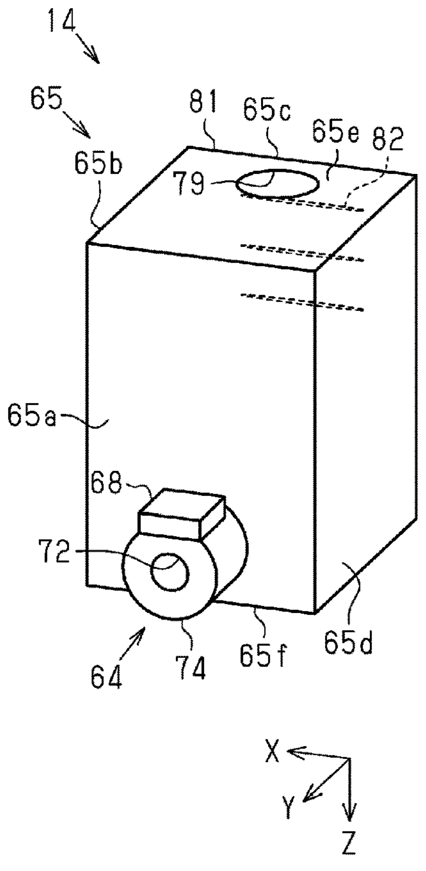
FIG. 45 is a schematic perspective view of a forty-first modification of the liquid container.

As shown in FIG. 45, the liquid accommodation vessel 65 may include the visual check section 81 provided on the third side surface 65*c*, which is different from the first side surface 65*a*, which faces the direction in which the lead-out section 72 opens. The injection port 79 may be provided further toward the third side surface 65*c* than is the center of the top surface 65*e*.

Forty-Second Modification

Figure 46:
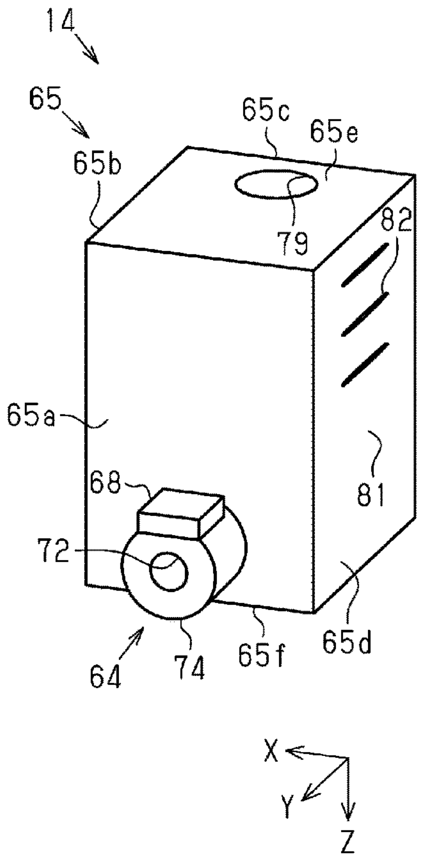
FIG. 46 is a schematic perspective view of a forty-second modification of the liquid container.

As shown in FIG. 46, the liquid accommodation vessel 65 may include the visual check section 81 provided on the fourth side surface 65*d*, which is different from the first side surface 65*a*, which faces the direction in which the lead-out section 72 opens. The injection port 79 may be provided further toward the third side surface 65*c* than is the center of the top surface 65*e*.

Forty-Third Modification

Figure 47:
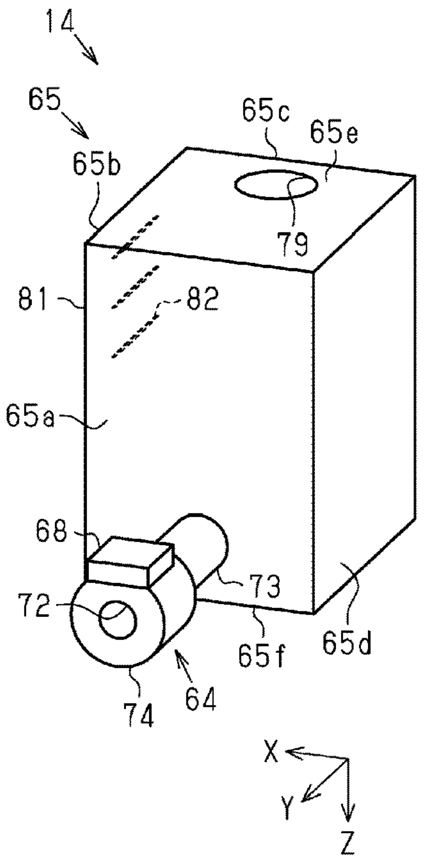
FIG. 47 is a schematic perspective view of a forty-third modification of the liquid container.

As shown in FIG. 47, the liquid accommodation vessel 65 may include the visual check section 81 provided on the second side surface 65*b*, which is different from the first side surface 65*a*, which is the side surface closest to the position where the flow path 73 is coupled. The injection port 79 may be provided further toward the third side surface 65*c* than is the center of the top surface 65*e*.

Forty-Fourth Modification

Figure 48:
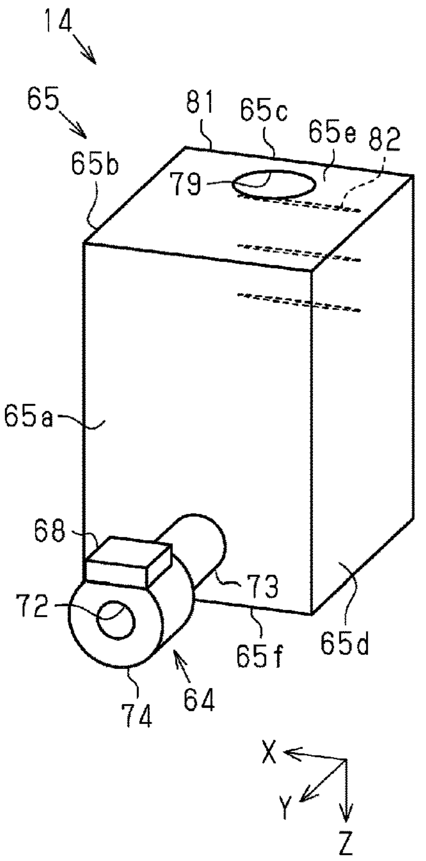
FIG. 48 is a schematic perspective view of a forty-fourth modification of the liquid container.

As shown in FIG. 48, the liquid accommodation vessel 65 may include the visual check section 81 provided on the third side surface 65*c*, which is different from the first side surface 65*a*, which is the side surface closest to the position where the flow path 73 is coupled. The injection port 79 may be provided further toward the third side surface 65*c* than is the center of the top surface 65*e*.

Forty-Fifth Modification

Figure 49:
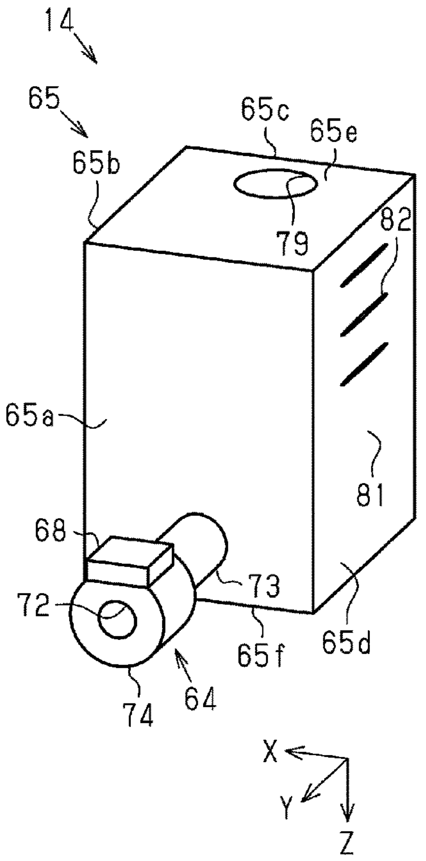
FIG. 49 is a schematic perspective view of a forty-fifth modification of the liquid container.

As shown in FIG. 49, the liquid accommodation vessel 65 may include the visual check section 81 provided on the fourth side surface 65*d*, which is different from the first side surface 65*a*, which is the side surface closest to the position where the flow path 73 is coupled. The injection port 79 may be provided further toward the third side surface 65*c* than is the center of the top surface 65*e*.

Forty-Sixth Modification

Figure 50:
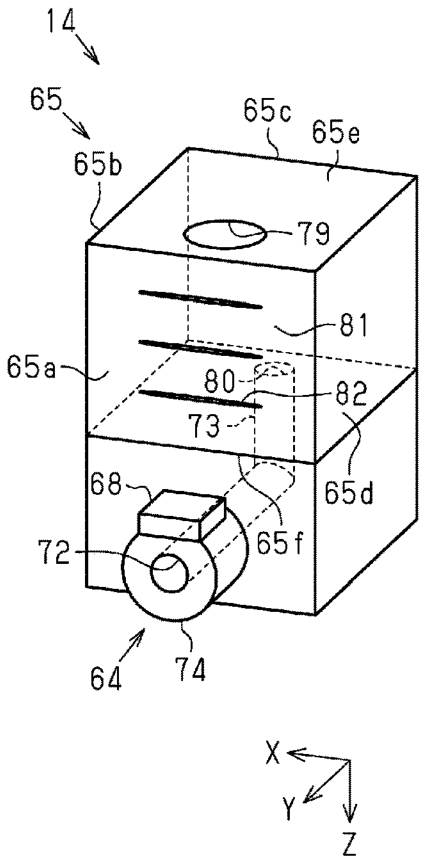
FIG. 50 is a schematic perspective view of a forty-sixth modification of the liquid container.

As shown in FIG. 50, the liquid accommodation vessel 65 may include the visual check section 81 provided on the first side surface 65*a*, which is different from the third side surface 65*c*, which is the side surface closest to the position where the flow path 73 is coupled. The injection port 79 may be provided further toward the first side surface 65*a* than is the center of the top surface 65*e*.

Forty-Seventh Modification

Figure 51:
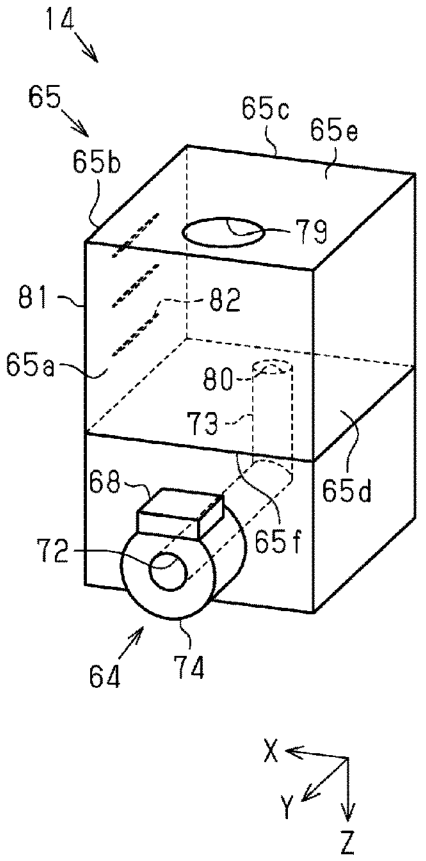
FIG. 51 is a schematic perspective view of a forty-seventh modification of the liquid container.

As shown in FIG. 51, the liquid accommodation vessel 65 may include the visual check section 81 provided on the second side surface 65*b*, which is different from the third side surface 65*c*, which is the side surface closest to the position where the flow path 73 is coupled. The injection port 79 may be provided further toward the first side surface 65*a* than is the center of the top surface 65*e*.

Forty-Eighth Modification

Figure 52:
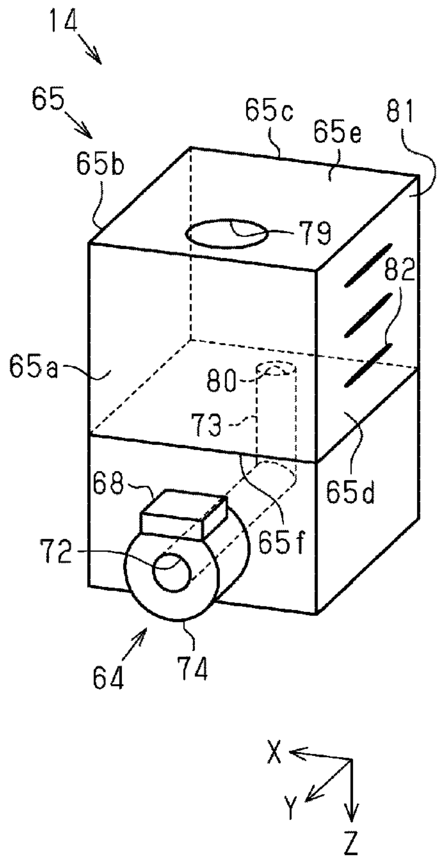
FIG. 52 is a schematic perspective view of a forty-eighth modification of the liquid container.

As shown in FIG. 52, the liquid accommodation vessel 65 may include the visual check section 81 provided on the fourth side surface 65*d*, which is different from the third side surface 65*c*, which is the side surface closest to the position where the flow path 73 is coupled. The injection port 79 may be provided further toward the first side surface 65*a* than is the center of the top surface 65*e*.

Forty-Ninth Modification

Figure 53:
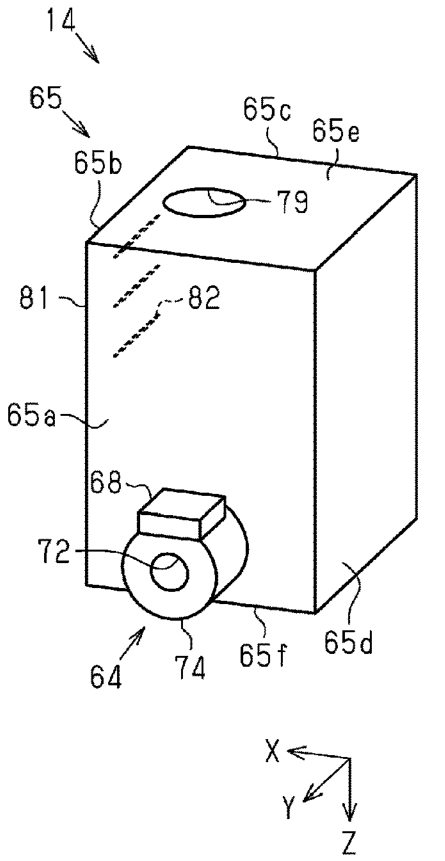
FIG. 53 is a schematic perspective view of a forty-ninth modification of the liquid container.

As shown in FIG. 53, the liquid accommodation vessel 65 may include the visual check section 81 provided on the second side surface 65*b*, which is different from the first side surface 65*a*, which faces the direction in which the lead-out section 72 opens. The injection port 79 may be provided further toward the second side surface 65*b* than is the center of the top surface 65*e*. Since the visual check section 81 is provided on a side surface other than the first side surface 65*a*, a user can easily grasp the state of the liquid level 86 during normal use.

Fiftieth Modification

Figure 54:
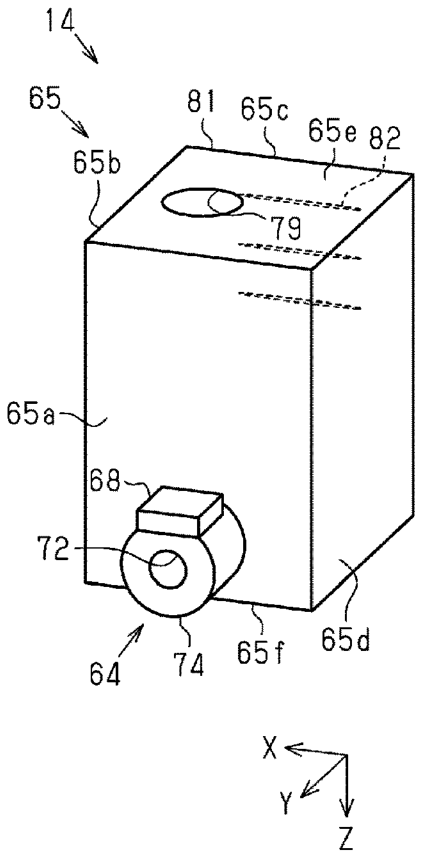
FIG. 54 is a schematic perspective view of a fiftieth modification of the liquid container.

As shown in FIG. 54, the liquid accommodation vessel 65 may include the visual check section 81 provided on the third side surface 65*c*, which is different from the first side surface 65*a*, which faces the direction in which the lead-out section 72 opens. The injection port 79 may be provided further toward the second side surface 65*b* than is the center of the top surface 65*e*.

Fifty-First Modification

Figure 55:
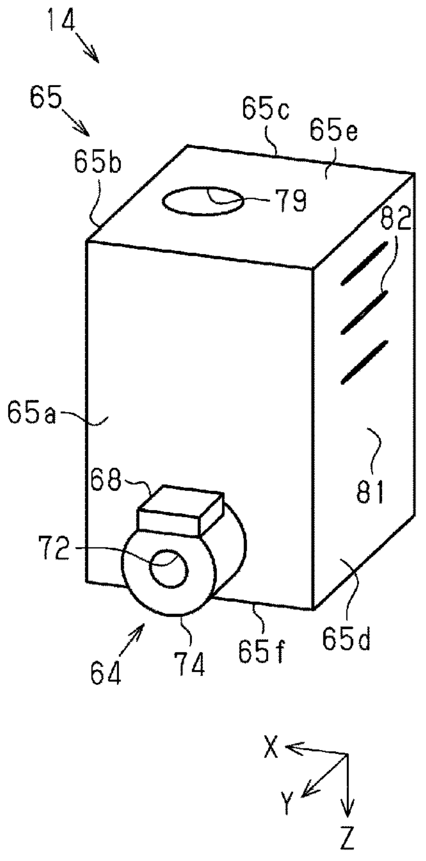
FIG. 55 is a schematic perspective view of a fifty-first modification of the liquid container.

As shown in FIG. 55, the liquid accommodation vessel 65 may include the visual check section 81 provided on the fourth side surface 65*d*, which is different from the first side surface 65*a*, which faces the direction in which the lead-out section 72 opens. The injection port 79 may be provided further toward the second side surface 65*b* than is the center of the top surface 65*e*.

Fifty-Second Modification

Figure 56:
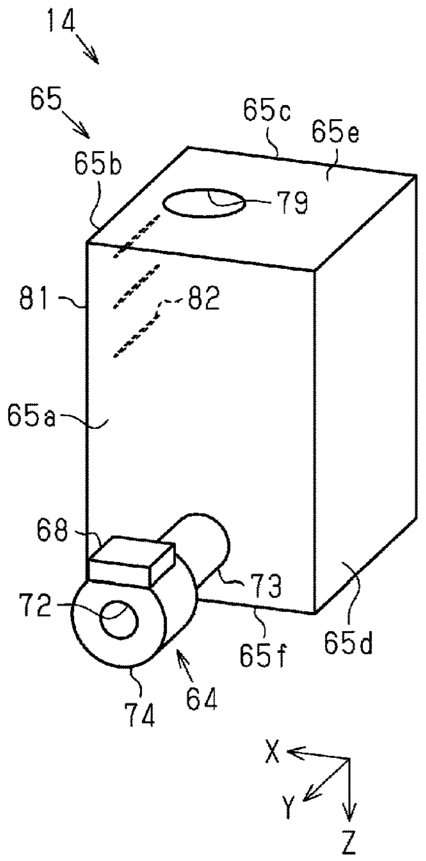
FIG. 56 is a schematic perspective view of a fifty-second modification of the liquid container.

As shown in FIG. 56, the liquid accommodation vessel 65 may include the visual check section 81 provided on the second side surface 65*b*, which is different from the first side surface 65*a*, which is the side surface closest to the position where the flow path 73 is coupled. The injection port 79 may be provided further toward the second side surface 65*b* than is the center of the top surface 65*e*.

Fifty-Third Modification

Figure 57:
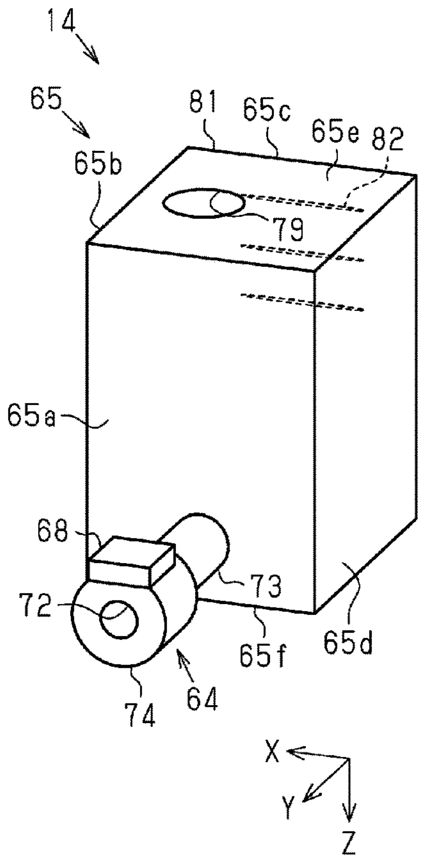
FIG. 57 is a schematic perspective view of a fifty-third modification of the liquid container.

As shown in FIG. 57, the liquid accommodation vessel 65 may include the visual check section 81 provided on the third side surface 65*c*, which is different from the first side surface 65*a*, which is the side surface closest to the position where the flow path 73 is coupled. The injection port 79 may be provided further toward the second side surface 65*b* than is the center of the top surface 65*e*.

Fifty-Fourth Modification

Figure 58:
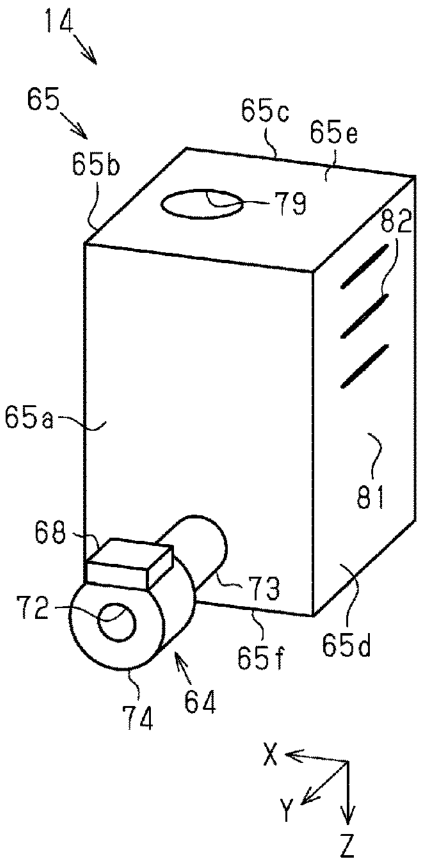
FIG. 58 is a schematic perspective view of a fifty-fourth modification of the liquid container.

As shown in FIG. 58, the liquid accommodation vessel 65 may include the visual check section 81 provided on the fourth side surface 65*d*, which is different from the first side surface 65*a*, which is the side surface closest to the position where the flow path 73 is coupled. The injection port 79 may be provided further toward the second side surface 65*b* than is the center of the top surface 65*e*.

Fifty-Fifth Modification

Figure 59:
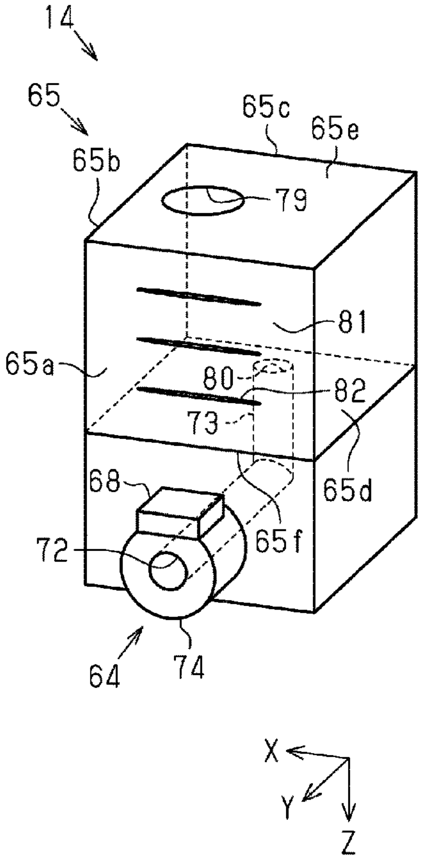
FIG. 59 is a schematic perspective view of a fifty-fifth modification of the liquid container.

As shown in FIG. 59, the liquid accommodation vessel 65 may include the visual check section 81 provided on the first side surface 65*a*, which is different from the third side surface 65*c*, which is the side surface closest to the position where the flow path 73 is coupled. The injection port 79 may be provided further toward the second side surface 65*b* than is the center of the top surface 65*e*.

Fifty-Sixth Modification

Figure 60:
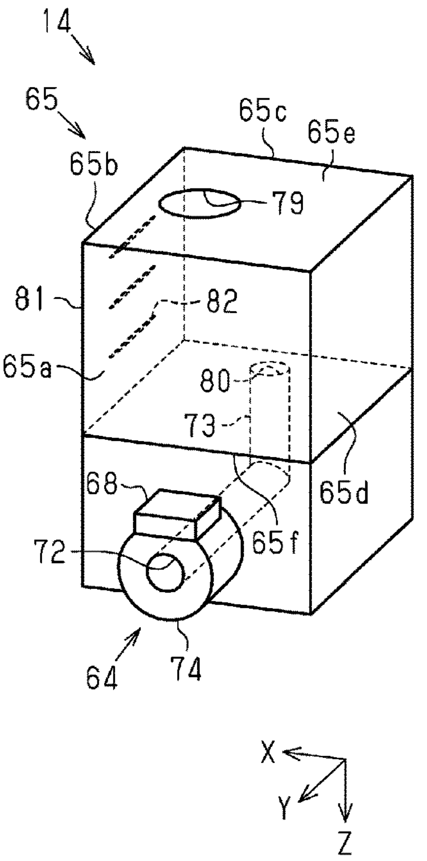
FIG. 60 is a schematic perspective view of a fifty-sixth modification of the liquid container.

As shown in FIG. 60, the liquid accommodation vessel 65 may include the visual check section 81 provided on the second side surface 65*b*, which is different from the third side surface 65*c*, which is the side surface closest to the position where the flow path 73 is coupled. The injection port 79 may be provided further toward the second side surface 65*b* than is the center of the top surface 65*e*.

Fifty-Seventh Modification

Figure 61:
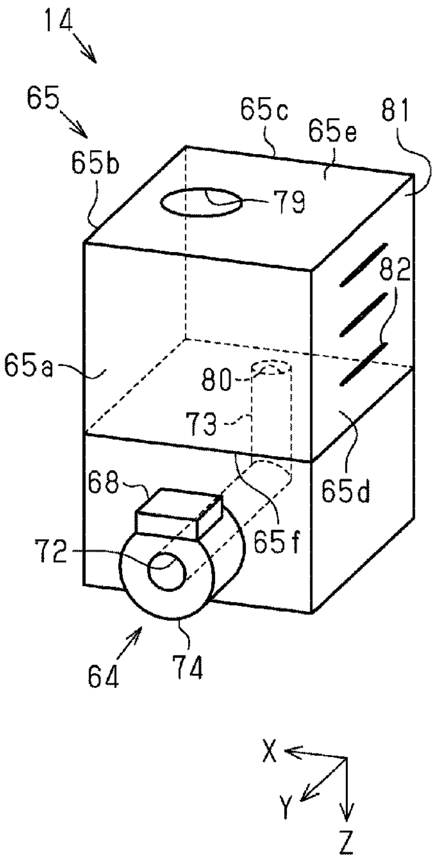
FIG. 61 is a schematic perspective view of a fifty-seventh modification of the liquid container.

As shown in FIG. 61, the liquid accommodation vessel 65 may include the visual check section 81 provided on the fourth side surface 65*d*, which is different from the third side surface 65*c*, which is the side surface closest to the position where the flow path 73 is coupled. The injection port 79 may be provided further toward the second side surface 65*b* than is the center of the top surface 65*e*.

Fifty-Eighth Modification

Figure 62:
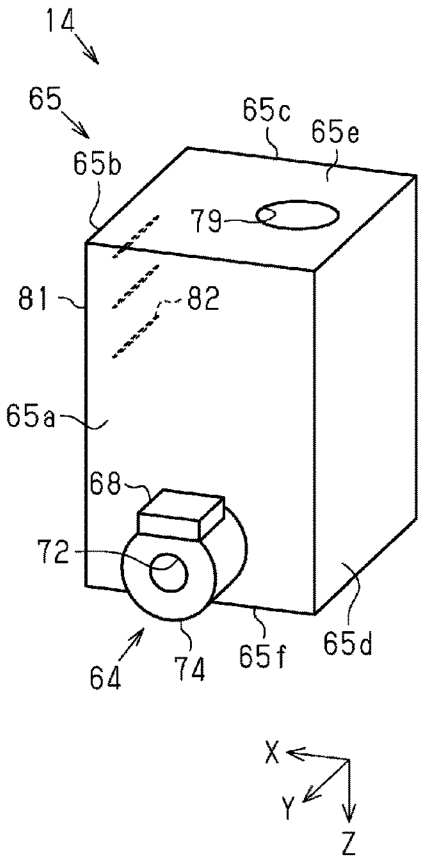
FIG. 62 is a schematic perspective view of a fifty-eighth modification of the liquid container.

As shown in FIG. 62, the liquid accommodation vessel 65 may include the visual check section 81 provided on the second side surface 65*b*, which is different from the first side surface 65*a*, which faces the direction in which the lead-out section 72 opens. The injection port 79 may be provided further toward the fourth side surface 65*d* than is the center of the top surface 65*e*.

Fifty-Ninth Modification

Figure 63:
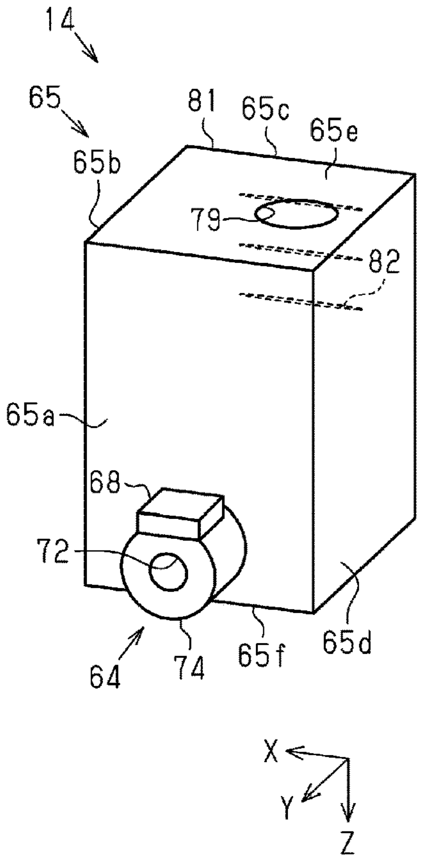
FIG. 63 is a schematic perspective view of a fifty-ninth modification of the liquid container.

As shown in FIG. 63, the liquid accommodation vessel 65 may include the visual check section 81 provided on the third side surface 65*c*, which is different from the first side surface 65*a*, which faces the direction in which the lead-out section 72 opens. The injection port 79 may be provided further toward the fourth side surface 65*d* than is the center of the top surface 65*e*.

Sixtieth Modification

Figure 64:
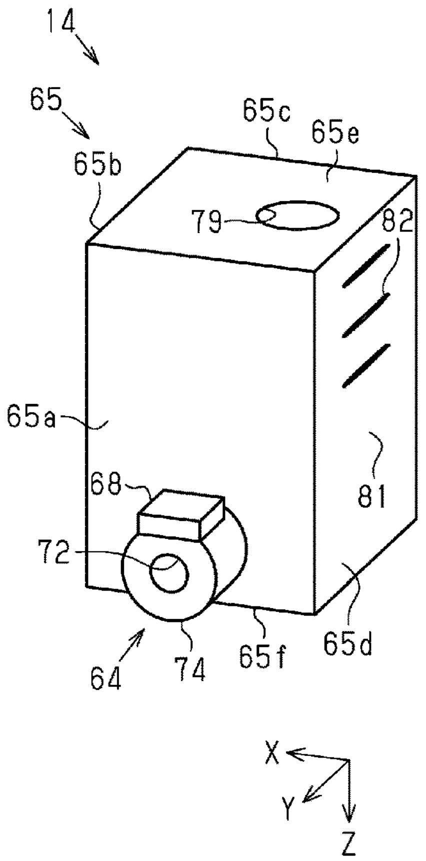
FIG. 64 is a schematic perspective view of a sixtieth modification of the liquid container.

As shown in FIG. 64, the liquid accommodation vessel 65 may include the visual check section 81 provided on the fourth side surface 65*d*, which is different from the first side surface 65*a*, which faces the direction in which the lead-out section 72 opens. The injection port 79 may be provided further toward the fourth side surface 65*d* than is the center of the top surface 65*e*.

Sixty-First Modification

Figure 65:
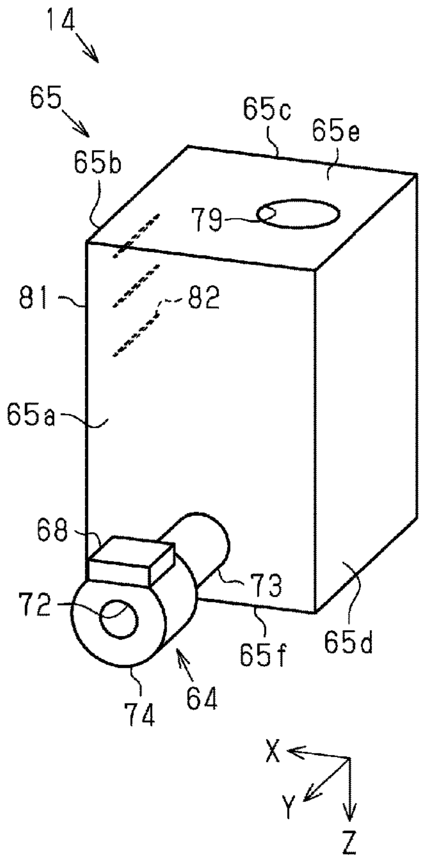
FIG. 65 is a schematic perspective view of a sixty-first modification of the liquid container.

As shown in FIG. 65, the liquid accommodation vessel 65 may include the visual check section 81 provided on the second side surface 65*b*, which is different from the first side surface 65*a*, which is the side surface closest to the position where the flow path 73 is coupled. The injection port 79 may be provided further toward the fourth side surface 65*d* than is the center of the top surface 65*e*.

Sixty-Second Modification

Figure 66:
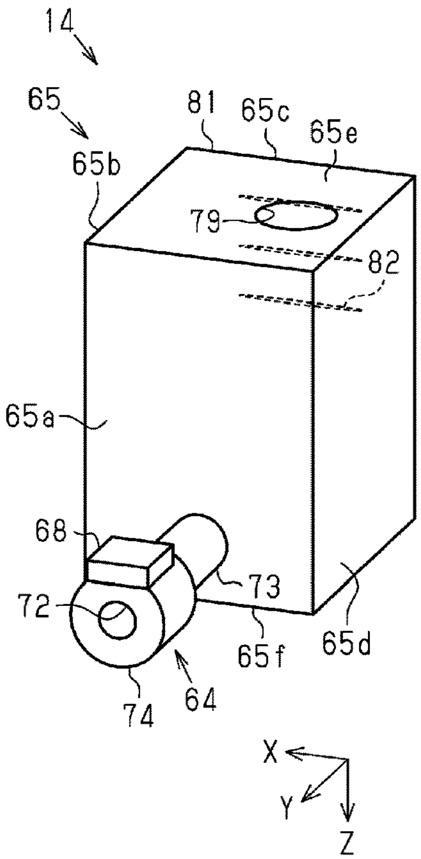
FIG. 66 is a schematic perspective view of a sixty-second modification of the liquid container.

As shown in FIG. 66, the liquid accommodation vessel 65 may include the visual check section 81 provided on the third side surface 65*c*, which is different from the first side surface 65*a*, which is the side surface closest to the position where the flow path 73 is coupled. The injection port 79 may be provided further toward the fourth side surface 65*d* than is the center of the top surface 65*e*.

Sixty-Third Modification

Figure 67:
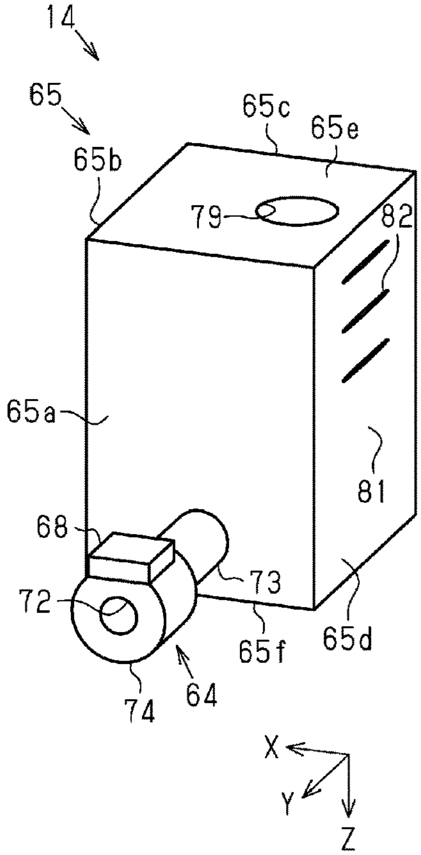
FIG. 67 is a schematic perspective view of a sixty-third modification of the liquid container.

As shown in FIG. 67, the liquid accommodation vessel 65 may include the visual check section 81 provided on the fourth side surface 65*d*, which is different from the first side surface 65*a*, which is the side surface closest to the position where the flow path 73 is coupled. The injection port 79 may be provided further toward the fourth side surface 65*d* than is the center of the top surface 65*e*.

Sixty-Fourth Modification

Figure 68:
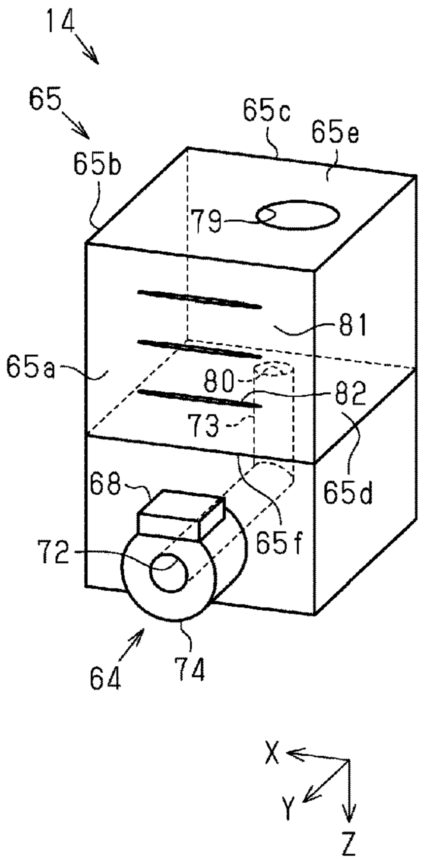
FIG. 68 is a schematic perspective view of a sixty-fourth modification of the liquid container.

As shown in FIG. 68, the liquid accommodation vessel 65 may include the visual check section 81 provided on the first side surface 65*a*, which is different from the third side surface 65*c*, which is the side surface closest to the position where the flow path 73 is coupled. The injection port 79 may be provided further toward the fourth side surface 65*d* than is the center of the top surface 65*e*.

Sixty-Fifth Modification

Figure 69:
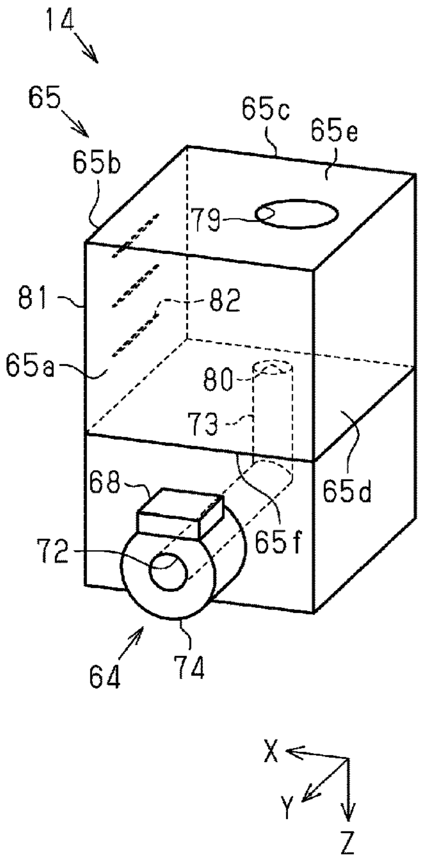
FIG. 69 is a schematic perspective view of a sixty-fifth modification of the liquid container.

As shown in FIG. 69, the liquid accommodation vessel 65 may include the visual check section 81 provided on the second side surface 65*b*, which is different from the third side surface 65*c*, which is the side surface closest to the position where the flow path 73 is coupled. The injection port 79 may be provided further toward the fourth side surface 65*d* than is the center of the top surface 65*e*.

Sixty-Sixth Modification

Figure 70:
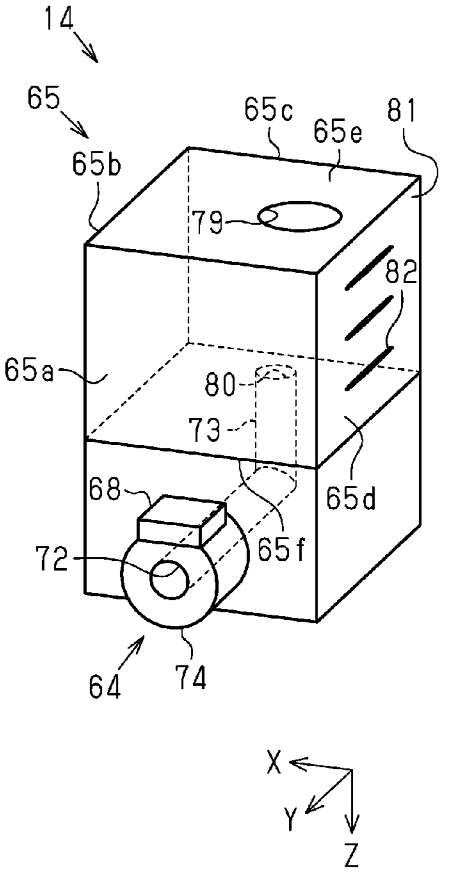
FIG. 70 is a schematic perspective view of a sixty-sixth modification of the liquid container.

As shown in FIG. 70, the liquid accommodation vessel 65 may include the visual check section 81 provided on the fourth side surface 65*d*, which is different from the third side surface 65*c*, which is the side surface closest to the position where the flow path 73 is coupled. The injection port 79 may be provided further toward the fourth side surface 65*d* than is the center of the top surface 65*e*.

Other Modifications

The injection port 79 may be provided at the center of the top surface 65*e*.

The injection port 79 may be formed in a cylinder provided on the top surface 65*e*.

The coupling section 64 may not be coupled to the liquid accommodation vessel 65, and liquid in the liquid accommodation vessel 65 may be led out from the lead-out section 72 by inserting the upstream end of the flow path 73 into the liquid accommodation vessel 65. In the coupling section 64, the inlet 76 provided at an upstream end of the flow path 73 may be inserted into the liquid accommodation vessel 65.

The coupler 13 may be capable of coupling to a bag-in-box container, in which a bag for holding liquid is stored in a cardboard box, instead of to the liquid container 14. That is, the liquid container 14 and the bag-in-box container are interchangeable. The bag-in-box container may include the circuit board 68 which can be electrically coupled to the circuit board coupler 61. The controller 20 may determine whether the liquid container 14 is coupled to the coupler 13 or the bag-in-box container is coupled to the coupler 13 based on the information stored in the circuit board 68. When a bag-in-box container is coupled to the coupler 13, the controller 20 may notify the remaining amount of the liquid. In a case where the liquid container 14 is coupled to the coupler 13, the controller 20 may not perform notification of the remaining amount of the liquid. That is, the circuit board 68 may store information for causing the liquid ejector 12 to perform an operation corresponding to a target coupled to the coupler 13.

The gauge 82 may not be provided in the visual check section 81. The gauge 82 may be provided at a position different from that of the visual check section 81. The gauge 82 may be provided at a position overlapping with the liquid level 86 when the user sees the visual check section 81 from the outside. For example, in a case where the first side surface 65*a* includes the visual check section 81, and assuming that the first side surface 65*a* is viewed from the near side in the depth direction Y, the gauge 82 may be provided on the third side surface 65*c* positioned at the far side.

The lid 83 may include a screw. The lid 83 may be removable by being rotated with respect to the liquid accommodation vessel 65.

The lid 83 may be attached to the liquid accommodation vessel 65 by being fitted into the injection port 79.

The liquid container 14 may not include the gripping section 67. The liquid container 14 may be fixed to the base 15, for example.

At least one of the first filter 69 or the second filter 75 may be fixed to the liquid container 14.

The coupling section 64 may be coupled to the center of the liquid accommodation vessel 65 in the vertical direction Z, or may be coupled to the upper portion of the liquid accommodation vessel 65.

The holder 66 may cover the entire liquid accommodation vessel 65. That is, the visual check section 81 may not be provided in the liquid container 14.

The circuit board 68 may be arranged at the same height as the lead-out section 72 or may be arranged at a position lower than the lead-out section 72, with regard to a state in which the liquid container 14 is coupled to the coupler 13.

The circuit board 68 may be provided in the liquid accommodation vessel 65.

The printing device 11 may be configured not to include the circuit board coupler 61 and the circuit board 68. The controller 20 may acquire information about the liquid container 14 coupled to the coupler 13 from an input unit such as a touch panel.

The liquid ejector 12 may be a liquid ejector that ejects or dispenses liquid other than ink. The state of the liquid discharged from the liquid ejector in the form of minute droplets includes a granular state, a teardrop state, and a thread-like state with a tail. Here, the liquid may be any material that can be ejected from the liquid ejector. For example, the liquid can be any substance when in its liquid phase, and includes a fluid body such as a liquid body having high or low viscosity, sol, gel water, other inorganic solvents, organic solvents, solutions, liquid resins, liquid metals, and metal melts. The liquid includes not only a liquid as one state of a substance but also a substance in which particles of a functional material composed of a solid such as a pigment or metal particles are dissolved, dispersed, or mixed in a solvent.

Typical examples of the liquid include ink as described in the above embodiments, liquid crystal, and the like.

Here, the ink includes general water-based ink and oil-based ink, and various liquid compositions such as gel ink and hot-melt ink. Specific examples of the liquid ejector are an apparatuses that eject a liquid containing a material, such as a color material or an electrode material in a dispersed or dissolved form, the material being used for manufacturing a liquid crystal display, an electroluminescence display, a surface emitting display, a color filter, or the like. The liquid ejector may be an apparatus that ejects a bioorganic substance used for manufacturing biochips, an apparatus used as a precision pipette for ejecting a liquid serving as a sample, a textile printer, a microdispenser, or the like. The liquid ejector may be an apparatus that ejects a lubricating oil to a precision machine such as a watch or a camera in a pinpoint manner, or an apparatus that discharges a transparent resin liquid, such as an ultraviolet curable resin, onto a substrate in order to form a micro-hemispherical lens, an optical lens, or the like that is used in an optical communication element or the like. The liquid ejector may be an apparatus that ejects an etching liquid such as an acid or an alkali in order to etch a substrate or the like. Hereinafter, technical ideas grasped from the above-described embodiment and modifications, and effects thereof, will be described.

(A) A liquid container is configured to attach to and detach from a coupler coupled to a liquid ejector for ejecting liquid, and that can be installed at a position separated from the liquid ejector, the liquid container including a liquid accommodation vessel having an accommodation chamber for accommodating the liquid and an injection port for injecting the liquid into the accommodation chamber, and a coupling section that includes a lead-out section configured to lead out the liquid in the accommodation chamber and that is configured to couple to the coupler.

According to this configuration, the liquid container can be installed at a position separated from the liquid ejector. That is, the liquid container is installed outside the liquid ejector. Therefore, the liquid container can increase the capacity of the accommodation chamber. Therefore, it is possible to increase the amount of the liquid to be injected into the accommodation chamber at one time, thereby reducing the frequency of liquid injection.

(B) The liquid container may further include a circuit board having a coupling terminal, and the coupling terminal may be configured to be coupled to a circuit board coupler provided in the coupler.

According to this configuration, the circuit board is coupled to the circuit board coupler via the coupling terminal. Therefore, it is possible to grasp the state of connection between the liquid container and the coupler based on the presence or absence of electrical coupling between the circuit board and the circuit board coupler.

(C) In the liquid container, the circuit board may be provided in the coupling section.

According to this configuration, the circuit board is provided in the coupling section. Therefore, the circuit board can be easily coupled to the circuit board coupler by connecting the coupling section to the coupler.

(D) The liquid container may further include a holder that is attached to at least one of the liquid accommodation vessel and the coupling section, wherein the circuit board may be provided in the holder.

According to this configuration, the circuit board is provided in the holder. That is, the circuit board is provided at a position separated from the lead-out section of the coupling section. Therefore, for example, even when liquid drips from the lead-out section, it is possible to reduce the risk that the liquid will adhere to the circuit board.

(E) In the liquid container, the coupling section may include a flow path coupling the liquid accommodation vessel and the lead-out section, and an adapter configured to attach to and detach from the coupler, and the lead-out section may be provided in the adapter.

According to this configuration, the lead-out section is provided in the adapter and is coupled to the liquid accommodation vessel via the flow path. Therefore, it is possible to increase the degree of freedom in the position of the lead-out section with respect to the liquid accommodation vessel.

(F) The liquid container may further include a circuit board having a coupling terminal, the coupling terminal may be configured to couple to a circuit board coupler provided in the coupler, and the circuit board may be provided in the adapter.

According to this configuration, the circuit board includes the coupling terminal. The circuit board is provided in the adapter. Therefore, the circuit board can be easily coupled to the circuit board coupler by attaching the adapter to the coupler.

(G) The circuit board may be arranged at a position higher than the lead-out section in a state in which the liquid container is coupled to the coupler.

According to this configuration, the circuit board is arranged at a higher position than the lead-out section in the state where the liquid container is coupled to the coupler. Therefore, for example, even when the liquid drips from the lead-out section, it is possible to reduce the risk that the liquid clings to the circuit board.

(H) The circuit board may be arranged at a position higher than the lead-out section in a state in which the liquid container is coupled to the coupler.

According to this configuration, it is possible to achieve an effect similar to that of the liquid container.

(I) In the liquid container, the liquid accommodation vessel may include the top surface in which the injection port is provided, the one-side surface facing in the direction in which the lead-out section opens, and a plurality of other side surfaces different from the one-side surface, and the injection port may be provided at a position further toward the one-side surface than is the center of the top surface.

According to this configuration, the one-side surface faces a direction in which the lead-out section opens. The injection port is provided at a position further toward the one-side surface than is the center of the top surface. Therefore, since the user can inject the liquid while checking the connection state between the lead-out section and the coupler, even if there is a connection failure, the user can easily grasp it.

(J) In the liquid container, the liquid accommodation vessel may include the top surface in which the injection port is provided, the one-side surface which is a side surface closest to a position to which the flow path is coupled, and a plurality of other side surfaces different from the one-side surface, and the injection port may be provided at a position further toward the one-side surface than is the center of the top surface.

According to this configuration, the one-side surface is the side surface closest to the position where the flow path is coupled. The injection port is provided at a position further toward the one-side surface than is the center of the top surface. Therefore, since the user can inject the liquid while checking the connection state between the liquid accommodation vessel and the flow path, even if there is a connection failure, the user can easily grasp it.

(K) In the liquid container, a visual check section for visually checking a liquid level of the liquid in the liquid accommodation vessel may be provided in the one-side surface.

According to this configuration, the visual check section is provided in the one-side surface. Therefore, the user can inject the liquid while visually checking the liquid level via the visual check section.

(L) In the liquid container, a visual check section for visually checking a liquid level of the liquid in the liquid accommodation vessel may be provided in at least one of the plurality of side surfaces.

According to this configuration, the visual check section is provided on a side surface other than the one-side surface. Therefore, for example, even when the liquid drips from the injection port, it is possible to reduce the risk that the liquid clings to the visual check section.

(M) In the liquid container, the liquid accommodation vessel may include the top surface in which the injection port is provided, the one-side surface facing in the direction in which the lead-out section is opened, and a plurality of other side surfaces different from the one-side surface, and the injection port may be provided at a position further toward at least the one side surface of the plurality of side surfaces than is the center of the top surface.

According to this configuration, the one-side surface faces a direction in which the lead-out section opens. The injection port is provided at a position further toward the side surface, which is different from the one-side surface, than is the center of the top surface. Therefore, since the user can inject the liquid from a side different from the side to which the lead-out section and the coupler are coupled, it is easy to secure an area around the injection port for injecting the liquid.

(N) In the liquid container, the liquid accommodation vessel may include the top surface in which the injection port is provided, the one-side surface which is a side surface closest to a position to which the flow path is coupled, and a plurality of side surfaces different from the one-side surface, and the injection port may be provided further toward at least one of the plurality of side surfaces than is the center of the top surface.

According to this configuration, the one-side surface is the side surface closest to the position where the flow path is coupled. The injection port is provided at a position further toward the side surface, which is different from the one-side surface, than is the center of the top surface. Therefore, since the user can inject the liquid from a side different from the side where the liquid accommodation vessel and the flow path are coupled, it is easy to secure an area around the injection port for injecting the liquid.

(O) In the liquid container, a visual check section for visually checking a liquid level of the liquid in the liquid accommodation vessel may be provided on the one-side surface.

According to this configuration, the visual check section is provided on the first side surface. Therefore, for example, even when the liquid drips from the injection port, it is possible to reduce the risk that the liquid clings to the visual check section.

(P) In the liquid container, a visual check section for visually checking a liquid level in the liquid accommodation vessel is provided on at least one of the plurality of side surfaces.

According to this configuration, the visual check section is provided on a side surface other than the one-side surface. Therefore, during normal use, the user can easily grasp the state of the liquid level.

(Q) In the liquid container, the coupling section may be coupled to a lower portion of the liquid accommodation vessel.

According to this configuration, the coupling section is coupled to the lower portion of the liquid accommodation vessel. Therefore, for example, compared to a case where the coupling section is coupled to the upper portion of the liquid accommodation vessel, it is possible to reduce the amount of liquid remaining in the liquid accommodation vessel.

(R) The liquid container may further include a filter configured to attach to and detach from the injection port.

According to this configuration, the filter is detachably and attachably provided in the injection port. Therefore, the filter can be easily replaced.

(S) The liquid container may further include a gripping section configured to be grasped by a user.

According to this configuration, the liquid container includes the gripping section. Therefore, the liquid container can be easily moved.

(T) A printing device includes a liquid ejector for ejecting liquid, a coupler coupled to the liquid ejector, and the liquid container configured to attach to and detach from the coupler.

According to this configuration, it is possible to achieve an effect similar to that of the liquid container.

(U) A coupling section has a downstream end that is attachable to and detachable from a coupler and an upstream end that is attachable to and detachable from or insertable into the liquid accommodation vessel, and includes an inlet connectable to or insertable into the liquid accommodation vessel, an adapter couplable to the coupler, a flow path connecting the inlet and the adapter, and a circuit board.

According to this configuration, the coupling section includes the flow path capable of coupling the inlet and the adapter. Therefore, the coupling section can easily couple the liquid accommodation vessel to the coupler. Therefore, it is possible to supply the liquid to the liquid ejector via the coupler from the liquid accommodation vessel installed at a position separated from the liquid ejector.

What is claimed is:

1. A liquid container that is configured to attach to and detach from a coupler coupled to a liquid ejector for ejecting liquid, the liquid container comprising:

a liquid accommodation vessel having an accommodation chamber for accommodating liquid and an injection port for injecting liquid into the accommodation chamber; and a coupling section that includes a lead-out section configured to lead out liquid in the accommodation chamber, and that is configured to couple to the coupler, wherein the coupler and the liquid container are installable outside of a main body of the liquid ejector, the coupling section includes:

a flow path coupling the liquid accommodation vessel and the lead-out section, and an adapter configured to attach to and detach from the coupler, and the lead-out section is provided in the adapter.

2. The liquid container according to claim 1, further comprising:

a circuit board including a coupling terminal, wherein the coupling terminal is configured to couple to a circuit board coupler provided in the coupler.

3. The liquid container according to claim 1, wherein the liquid accommodation vessel includes:

a top surface in which the injection port is provided, a one-side surface, which is a side surface closest to a position to which the flow path is coupled, and a plurality of side surfaces different from the one-side surface, and the injection port is provided at a position further toward the one-side surface than is a center of the top surface.

4. The liquid container according to claim 3, wherein a visual check section for visually checking a liquid level of liquid in the liquid accommodation vessel is provided in the one-side surface.

5. The liquid container according to claim 3, wherein a visual check section for visually checking a liquid level of liquid in the liquid accommodation vessel is provided in at least one of the plurality of side surfaces.

6. The liquid container according to claim 1, wherein the liquid accommodation vessel includes a top surface in which the injection port is provided, a one-side surface on which the adapter that includes the lead-out section is mounted, the adapter being mounted on the one-side surface adjacent to a bottom surface of the liquid accommodation vessel, and a plurality of side surfaces different from the one-side surface, and the injection port is provided further toward at least the one-side surface of the plurality of side surfaces than is a center of the top surface.

7. The liquid container according to claim 6, wherein a visual check section for visually checking a liquid level of liquid in the liquid accommodation vessel is provided in the one-side surface.

8. The liquid container according to claim 6, wherein a visual check section for visually checking a liquid level of liquid in the liquid accommodation vessel is provided in at least one of the plurality of side surfaces.

9. The liquid container according to claim 1, wherein the coupling section is coupled to a lower portion of the liquid accommodation vessel.

10. The liquid container according to claim 1, further comprising:

a filter configured to attach to and detach from the injection port.

11. The liquid container according to claim 1, further comprising:

a gripping section configured to be grasped by a user.

12. A printing device comprising:

a liquid ejector for ejecting liquid;

a coupler coupled to the liquid ejector; and the liquid container according to claim 1, wherein the liquid container is detachably coupled to the coupler.

13. A liquid container that is configured to attach to and detach from a coupler coupled to a liquid ejector for ejecting liquid, the liquid container comprising:

a liquid accommodation vessel having an accommodation chamber for accommodating liquid and an injection port for injecting liquid into the accommodation chamber;

a coupling section that includes a lead-out section configured to lead out liquid in the accommodation chamber, and that is configured to couple to the coupler; and a circuit board including a coupling terminal, wherein the coupler and the liquid container are installable outside of a main body of the liquid ejector, and the coupling terminal is configured to couple to a circuit board coupler provided in the coupler when the coupling section is coupled to the coupler.

14. A liquid container that is configured to attach to and detach from a coupler coupled to a liquid ejector for ejecting liquid, the liquid container comprising:

a liquid accommodation vessel having an accommodation chamber for accommodating liquid and an injection port for injecting liquid into the accommodation chamber;

a coupling section that includes a lead-out section configured to lead out liquid in the accommodation chamber, and that is configured to couple to the coupler; and a circuit board including a coupling terminal, wherein the coupler and the liquid container are installable outside of a main body of the liquid ejector, the coupling section includes:

a flow path coupling the liquid accommodation vessel and the lead-out section, and an adapter configured to attach to and detach from the coupler, the lead-out section is provided in the adapter the coupling terminal is configured to couple to a circuit board coupler provided in the coupler.

15. The liquid container according to claim 14, wherein the circuit board is provided in the coupling section.

16. The liquid container according to claim 14, further comprising:

a holder that is attached to at least one of the liquid accommodation vessel and the coupling section, wherein the circuit board is provided in the holder.

17. The liquid container according to claim 14, wherein the circuit board is provided in the adapter.

18. The liquid container according to claim 17, wherein the circuit board is arranged at a position higher than the lead-out section, in a state in which the liquid container is coupled to the coupler.

19. The liquid container according to claim 17, wherein the liquid accommodation vessel includes a top surface in which the injection port is provided, a one-side surface facing in the direction in which the lead-out section opens, and a plurality of side surfaces different from the one-side surface, and the injection port is provided at a position further toward the one-side surface than is a center of the top surface.

20. The liquid container according to claim 17, wherein the liquid accommodation vessel includes a top surface in which the injection port is provided, a one-side surface, which is a side surface closest to a position to which the flow path is coupled, and a plurality of side surfaces different from the one-side surface, and the injection port is provided further toward at least the one-side surface of the plurality of side surfaces than is a center of the top surface.

21. The liquid container according to claim 14, wherein the circuit board is arranged at a position higher than the lead-out section, in a state in which the liquid container is coupled to the coupler.

* * * * *